(12) United States Patent
Koike et al.

(10) Patent No.: US 6,515,876 B2
(45) Date of Patent: Feb. 4, 2003

(54) DC-TO-DC CONVERTER

(75) Inventors: Kengo Koike, Kamifukuoka (JP); Kei Okada, Kawagoe (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 09/996,835

(22) Filed: Nov. 29, 2001

(65) Prior Publication Data

US 2002/0067626 A1 Jun. 6, 2002

(30) Foreign Application Priority Data

Dec. 4, 2000 (JP) ........................................ 2000-369199

(51) Int. Cl.[7] ............................................. H02M 3/335
(52) U.S. Cl. ................. 363/21.16; 363/21.12; 363/21.15
(58) Field of Search .................... 363/16, 20, 21.01, 363/21.12, 21.15, 21.16, 95, 97, 131

(56) References Cited

U.S. PATENT DOCUMENTS

| | | | | |
|---|---|---|---|---|
| 4,849,869 A | * | 7/1989 | Tanuma et al. | 363/21 |
| 5,661,642 A | * | 8/1997 | Shimashita | 363/21 |
| 5,880,942 A | * | 3/1999 | Leu | 363/49 |
| 6,111,762 A | * | 8/2000 | Igarashi et al. | 363/21 |
| 6,445,598 B1 | * | 9/2002 | Yamada | 363/21.12 |

FOREIGN PATENT DOCUMENTS

| | | |
|---|---|---|
| JP | 09140128 A | 5/1997 |
| JP | 2000023458 A | 1/2000 |

* cited by examiner

*Primary Examiner*—Matthew Nguyen
(74) *Attorney, Agent, or Firm*—Woodcock Washburn LLP

(57) ABSTRACT

A transformer has a primary winding connected between a pair of d.c. input terminals via an on-off switch, and a secondary winding connected between a pair of d.c. output terminals via a rectifying and smoothing circuit. The output voltage applied from the rectifying and smoothing circuit to the load is held constant by switching the input voltage through feedback control. The switch is driven in either of two different prescribed modes depending upon whether the converter is under normal or light load. In order to ascertain the load magnitude a flyback period determination circuit is connected to a tertiary winding of the transformer for providing a signal indicative of a flyback period during which a flyback voltage exists across the transformer tertiary after the switch is turned off each time. Each flyback period is compared with two different reference periods of time for hysteretic determination of whether the converter is under normal or light load. Several other embodiments are disclosed.

16 Claims, 19 Drawing Sheets

DC-TO-DC CONVERTER

BACKGROUND OF THE INVENTION

This invention relates generally to d.c.-to-d.c. converters which convert one direct-current voltage into another, and particularly to a d.c.-to-d.c. converter for providing a constant output voltage through feedback control. More particularly, the invention concerns a d.c.-to-d.c. converter of the type capable of operation in either of two different modes (e.g. different numbers of switchings per unit length of time) according to whether the converter is loaded normally or less than so.

The d.c.-to-d.c. converter of the kind under consideration comprises a transformer having a primary winding connected across a d.c. power supply via an on-off switch, a rectifying and smoothing circuit connected to the secondary winding of the transformer for providing a unidirectional output voltage, an output voltage detector circuit connected to the rectifying and smoothing circuit, another detector circuit for detecting the magnitude of the current flowing through the switch, and a switch control circuit for on-off control of the switch according to the outputs from the output voltage detector circuit and the switch current detector circuit.

There are two familiar switching methods. One, known in the art as the ringing choke converter method, is such that the switching frequency is made higher with a drop in the power requirement of the load. Another involves pulse duration modulation; that is, the switching pulses remain unchanged in repetition frequency but are reduced in duration with less power consumption by the load. The ringing choke converter method is objectionable for the very high switching frequencies that unavoidably occur during converter operation, particularly under light load. Such high switching frequencies have made inconveniently high the ratio of the switching loss, or loss of power due to switching, to the power actually consumed by the load.

According to switching control by pulse duration modulation, on the other hand, the usual practice is to set the switching frequency as high as, say, 100 kHz with a view to the reduction of power loss at the transformer under normal load, as well as to the size reduction of the converter. This high switching frequency is maintained when the converter is operating in light load mode, too, making the number of switchings per unit length of time unnecessary high for that mode.

Japanese Unexamined Patent Publication No. 2000-23458 represents a solution to this poor efficiency of the prior art d.c.-to-d.c. converters under light load. The solution is such that the converter is operated at intervals under light load. Switching loss is lessened through overall reduction of switchings during the light load operation, although, admittedly, stability in output voltage is somewhat sacrificed. Another solution is found in Japanese Unexamined Patent Publication No. 9-140128, which teaches use of a lower switching frequency under light load than that under normal load.

Improvement in converter efficiency by switching between either set of two different operating modes depends upon constant monitoring of the variable power requirement of the load and, above all, accurate ascertainment of a level at which the operating modes are to be switched from one to the other. Although some suggestions have been made to this end, they are mostly unsatisfactory in either the simplicity of construction or the reliability of operation.

SUMMARY OF THE INVENTION

The present invention seeks, in a d.c.-to-d.c. converter of the kind defined, to accurately detect the power requirement of the load thereon by simpler circuit means than heretofore, in order to make switching control accordingly.

Stated in brief, the present invention concerns a d.c.-to-d.c. converter of the general construction comprising a switch connected between a pair of converter input terminals via inductance means such as a transformer, a rectifying and smoothing circuit connected to the inductance means for providing a d.c. output voltage to be applied to a load, and an output voltage detector circuit for detecting the output voltage.

More specifically, the invention provides, in the d.c.-to-d.c. converter of the general construction set forth above, a combination comprising a switch control circuit connected between the output voltage detector circuit and the switch for delivering to the latter the series of switching pulses of durations controlled according to the converter output voltage in order to keep the converter output voltage constant. A flyback period determination circuit is connected to the inductance means for providing a flyback period signal indicative of a flyback period during which a flyback voltage develops across the inductance means after the switch has been turned off each time. The flyback period determination circuit has an output connected to a load magnitude discriminator circuit, to whose another input is connected a reference period generator circuit which provides at least one prescribed reference period of time for comparison with the successive flyback periods. Inputting the flyback period signal and the reference period signal, the load magnitude discriminator circuit determines that the converter is loaded normally if each flyback period is longer than the reference period, and lightly if otherwise.

The output from the load magnitude discriminator circuit, indicative of normal or light loading on the converter, is fed into the switch control circuit. This switch control circuit is equipped to make on-off control of the switch in either of a selected set of two different modes depending upon whether the converter is under normal or light load. Several sets of two different switching modes are possible according to the invention. For example, in one set of such modes disclosed herein, the switch is driven at one repetition frequency when the converter is under normal load, and at another, less frequency when it is under light load. In another set the switch is driven at a frequency in inverse proportion to the load magnitude when the converter is under normal load, and at a fixed frequency less than the minimum of the normal load frequencies, when it is under light load. In still another set the switch is driven at a fixed frequency when the converter is under normal load, and at intervals at that frequency when it is under light load. In yet another set the switch is driven at a frequency in inverse proportion to the load magnitude when the converter is under normal load, and at intervals and at a fixed frequency less than the minimum of the normal load frequencies, when it is under light load. All such sets of modes are alike in that the average number of switchings per unit length of time is less under light, than under normal, loading.

Thus the invention advocates determination of whether the converter is under normal or light load from the duration of the flyback voltage. The load magnitude is accurately ascertainable in this manner by means comprising the flyback period determination circuit, the reference period generator circuit and the load magnitude discriminator circuit, which are all simple in construction and easy of fabrication with familiar electronic devices only.

According to a further feature of the invention, the reference period generator circuit provides two different reference periods for comparison with each flyback period by the load magnitude discriminator circuit. The switch is driven in light load mode when each flyback period becomes less than the first reference period. Once the light load mode is set up, that mode is maintained as long as the flyback period does not become longer than the second reference period which is longer than the first. Moreover, once the normal load mode is reestablished, this mode is maintained as long as the flyback period does not become less than the first reference period. In short the load magnitude is determined hysteretically, affording smooth transition between the two modes even in the event of a gradual change in load magnitude.

The above and other objects, features and advantages of this invention will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
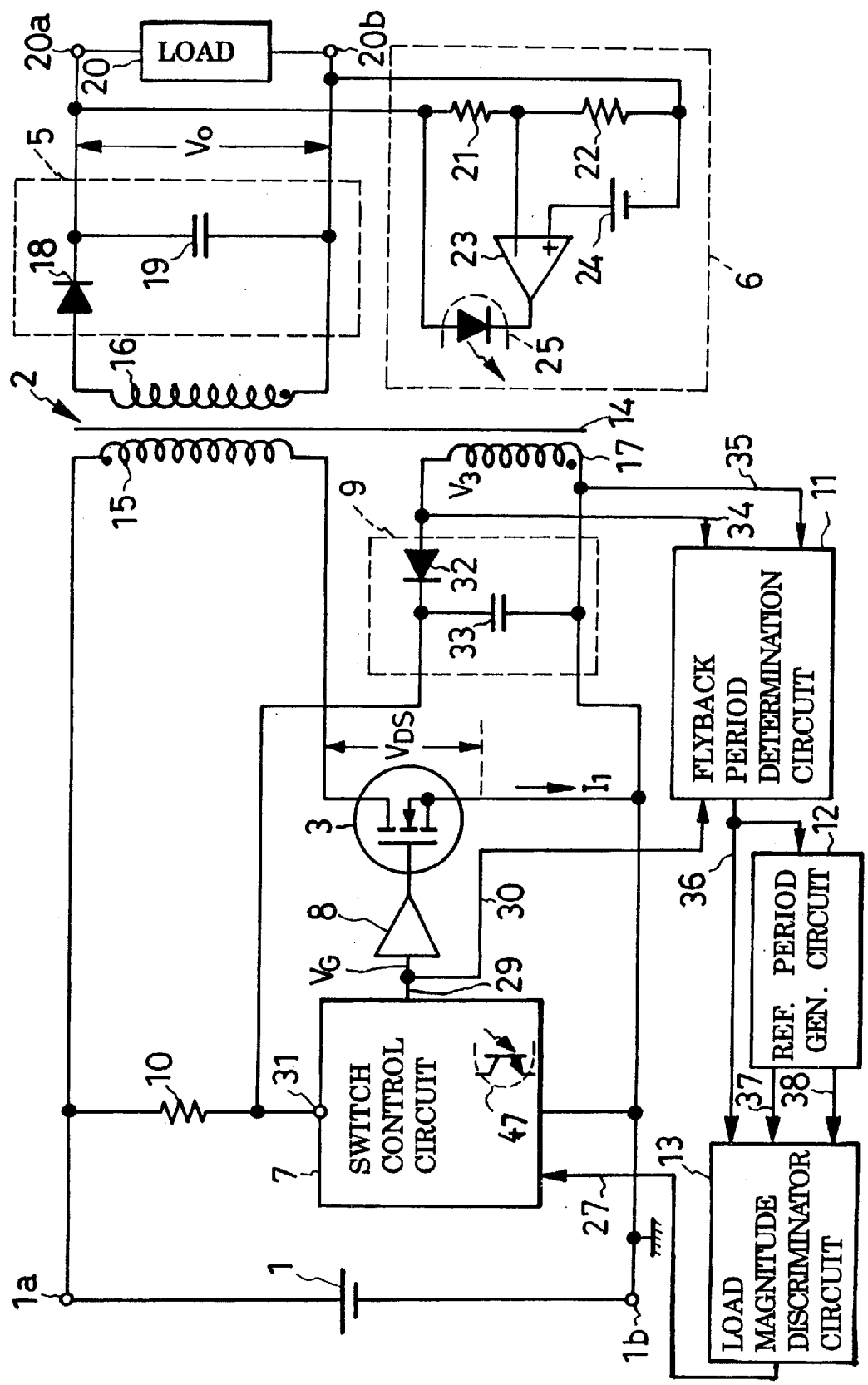
FIG. 1 is a schematic electrical diagram, partly in block form, of a first preferred form of d.c.-to-d.c. converter embodying the principles of this invention.

The present invention is believed to be best embodied in the flyback d.c.-to-d.c. converter, known also as switching regulator, shown in its entirety in FIG. 1. The converter has a pair of input terminals 1a and 1b, with a d.c. power supply 1 shown connected therebetween, and a pair of output terminals 20a and 20b with a load 20 to be powered shown connected therebetween. Among the primary components of the converter 1 are:

1. An inductance means shown as a transformer 2 having a magnetic core 14, a primary winding 15 coiled around the core with the opposite extremities thereof connected to the pair of input terminals 1a and 1b, a secondary winding 16 also coiled around the core 14 with the opposite extremities thereof connected to the pair of output terminals 20a and 20b, and a tertiary winding 17 also coiled around the core 14.

2. An on-off switch 3 shown as an n-channel insulated-gate field-effect transistor connected between the input terminal 1b and the transformer primary 15.

3. A first rectifying and smoothing circuit 5 connected between the transformer secondary 16 and the pair of output terminals 20a and 20b for providing a d.c. output voltage to be applied to the load 20.

4. An output voltage detector circuit 6 connected to the output side of the smoothing circuit 5 for detecting the output voltage being applied to the load 20.

5. A switch control circuit 7 for providing switching pulses of variable, controlled durations for application to the control terminal (i.e. gate of the FET in this case) of the switch 3 via a switch driver circuit 8 thereby to turn the switch on and off.

6. A second rectifying and smoothing circuit 9 connected to the transformer tertiary 17 for internally powering the switch control circuit 7 with a d.c. voltage.

7. A starting resistor 10 connected between the converter input terminal 1a and the supply input 31 of the switch control circuit 7.

8. A flyback period determination circuit 11 having inputs connected to the transformer tertiary 17 and switch control circuit 7 for ascertaining the period of time during which a flyback voltage exists across the transformer 2 after the switch 3 has been turned off each time, this period being herein referred to as the flyback period.

9. A reference period generator circuit 12 for generating signals indicative of two different reference periods of time.

10. A load magnitude discriminator circuit 13 having inputs connected to the flyback period determination circuit 11 and the reference period generator circuit 12 for real-time determination of whether the converter is under normal or light load, by comparing the successive flyback periods ascertained by the flyback period determination circuit 11 with the two reference periods of time supplied from the reference period generator circuit 12.

Electromagnetically coupled together, the three windings 15–17 of the transformer 2 have polarities indicated by the dots in FIG. 1. Thus is energy stored on the transformer 2 during the conducting periods of the switch 3, and released during its nonconducting periods. The FET switch 3 has a drain connected to the input terminal 1a via the transformer primary 15, a source connected to the second input terminal 1b, which is grounded, and a gate connected to the switch control circuit 7 via the switch driver circuit 8.

The rectifying and smoothing circuit 5 is shown as a combination of a rectifying diode 18 and a smoothing capacitor 19. The smoothing capacitor 19 is connected in parallel with the transformer secondary 16 via the rectifying diode 18. The rectifying diode 18 is so oriented with respect to the transformer windings 15 and 16 as to be conductive during the nonconducting periods of the switch 3. The smoothing capacitor 19 is also connected between the pair of output terminals 20a and 20b.

The output voltage detector circuit 6 includes two voltage-dividing resistors 21 and 22 connected in series with each other between the pair of output terminals 20a and 20b for detecting the converter output voltage $V_o$. The junction between these resistors 21 and 22 is connected to one input of a differential amplifier 23, the other input of which is connected to a reference voltage source 24. Connected between the converter output terminal 19a and the output of the differential amplifier 23, a light-emitting diode or LED 25 provides an optical output having intensity proportional to the converter output voltage $V_o$.

The switch control circuit 7 includes a phototransistor 47 to be irradiated by the LED 25 of the output voltage detector circuit 6, for providing a voltage proportional to the converter output voltage $V_o$. Thus fed back to the switch control circuit 7, the converter output voltage is utilized for modulating the durations of the switching pulses to be applied to the switch 3.

Besides being optically coupled to the output voltage detector circuit 6, the switch control circuit 7 has an input connected to the load magnitude discriminator circuit 13 by way of a line 27. Inputting this load magnitude discriminator circuit output, which is indicative of whether the converter is loaded normally or lightly, the switch control circuit 7 makes on-off control of the switch 3 in either of two prescribed different modes suiting the load magnitude. The supply terminal 31 of the switch control circuit 7 is connected as aforesaid to the rectifying and smoothing circuit 9 and, via the resistor 10, to the converter input terminal 1a. The rectifying and smoothing circuit 9 comprises a diode 32 and a capacitor 33 connected to the transformer tertiary 17. The output of the switch control circuit 7 is connected by way of a line 29 to the switch driver circuit 8 and thence to the switch 3 and, by way of a line 30, to the flyback period determination circuit 11. The switch control circuit 7 is shown in detail in FIG. 2, to which reference will be had presently.

The flyback period determination circuit 11 is intended for finding the aforesaid flyback period, or the duration of the flyback voltage which develops when the energy that has been stored on the transformer 2 during each conducting period of the switch 3 is released upon subsequent nonconduction of the switch. To this end the flyback period determination circuit 11 is connected to the opposite extremities of the transformer tertiary 17 by way of lines 34 and 35. More will be said about the flyback period determination circuit II with reference to FIG. 3.

Connected to the output line 36 of the flyback period determination circuit 11, the reference period generator circuit 12 generates signals indicative of two reference periods of time from the beginning of each flyback period, for delivery to the load magnitude discriminator circuit 13 by way of lines 37 and 37. The reference period generator circuit 12 is also shown in detail in FIG. 3.

The load magnitude discriminator circuit 13 relies on the outputs from the flyback period determination circuit 11 and the reference period generator circuit 12 for judgment of whether the power demand of the load 20 is normal or less. The results of such judgment are fed over the line 27 to the switch control circuit 7. This switch control circuit will then respond by driving the switch 3 at a relatively high switching frequency if the converter proves normally loaded, and at a lower switching frequency if otherwise. The load magnitude discriminator circuit 13 is also shown in detail in FIG. 3.

Figure 2:
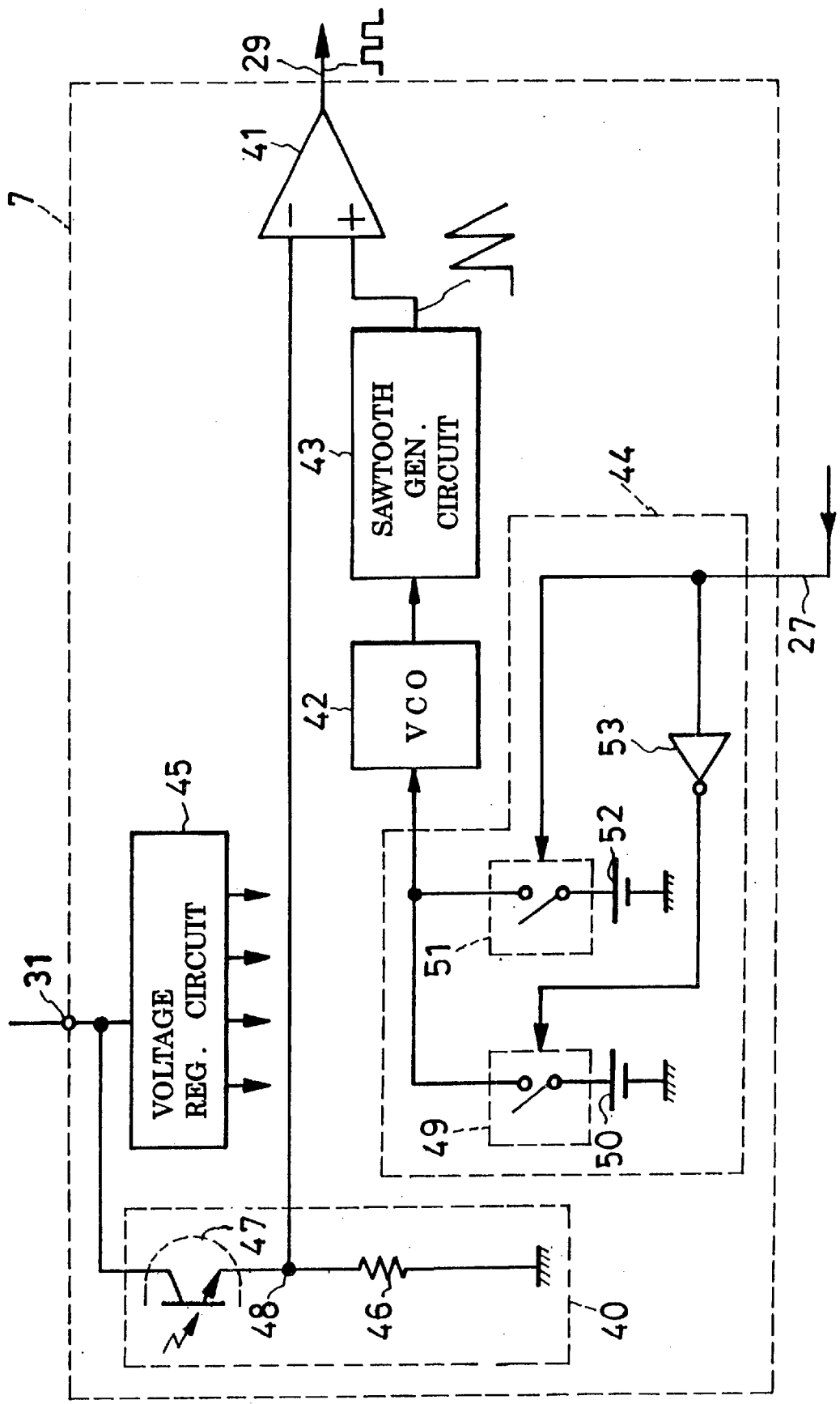
FIG. 2 is a schematic electrical diagram showing in more detail the switch control circuit of the FIG. 1 converter.

With reference to FIG. 2 the switch control circuit 7 broadly comprises:

1. A voltage feedback circuit 40 for providing a voltage feedback signal indicative of the converter output voltage, in response to the optical output from the output voltage detector circuit 6, FIG. 1.

2. A voltage-controlled oscillator or VCO 42 for generating a series of clock pulses at either of two prescribed different repetition frequencies depending upon whether the converter is under normal or light load.

3. A sawtooth generator circuit 43 connected to the output of the VCO 42 for putting out a sawtooth voltage at either of two different frequencies determined by the output frequency of the VCO.

4. A mode selector circuit 44 connected between load magnitude discriminator circuit 13 and VCO 42 for changing the output frequency of the latter between the two prescribed values depending upon the power consumption of the load 20.

5. A comparator 41 having one input connected to the voltage feedback circuit 40 and another input to the sawtooth generator circuit 43 for putting out a series of duration-modulated switching pulses for on-off control of the switch 3 by comparing the outputs from the circuits 40 and 43.

6. A voltage regulator circuit 45 for powering the various necessary components of the switch control circuit 7.

The voltage feedback circuit 40 includes a resistor 46 in addition to the aforesaid phototransistor 47. The phototransistor 47 has a collector connected to the supply terminal 31, and an emitter grounded via the resistor 46. There is thus obtained at the junction 48 between resistor 46 and phototransistor 47 a potential proportional to the converter output voltage $V_o$.

The VCO 42 generates clock pulses at a relatively high frequency, widely accepted in the art, of 100 kHz when the power requirement of the load 20 is normal and at a substantively less frequency of, say, 20 kHz when the power requirement is less. The mode selector circuit 44 is connected to the VCO 42 for changing its output frequency between these two values. Included are a first power supply 50 connected to the VCO 42 via a first on-off switch 49, and a second power supply 52 also connected to the VCO via a second on-off switch 51. Both switches 49 and 51 have their control inputs connected to the output line 27 of the load magnitude discriminator circuit 13, the first switch 49 via an inverter 53, and the second switch 51 directly. Consequently, the first switch 49 is closed when the load magnitude discriminator circuit output is low, indicating normal loading, and the second switch 51 is closed when the load magnitude discriminator circuit output is high, indicating light loading. The VCO 42 puts out clock pulses at 100 kHz upon closure of the first switch 49, and at 20 kHz upon closure of the second switch 51.

The VCO 42 delivers the clock pulses to the sawtooth generator 43 at either of the two predetermined frequencies. The resulting sawtooth output from the generator 43 is of the same frequency as that of the incoming clock pulses.

The comparator 41 has a negative input connected to the junction 48 of the voltage feedback circuit 40, and a positive input to the sawtooth generator circuit 43. Thus the comparator 41 puts out the switching pulses $V_G$, shown at (C) in FIG. 4, when the sawtooth voltage is higher than the output voltage of the feedback circuit 40. The comparator 41 has its output connected to the gate of the FET switch 3, FIG. 1, via the switch driver circuit 8, so that this switch is turned on and off by the switching pulses $V_G$.

The voltage regulator circuit 45 is connected to the supply terminal 31 of the switch control circuit 7. Regulating the incoming supply voltage, the voltage regulator circuit 45 powers the necessary components of the switch control circuit 7. The specific connections of the voltage regulator circuit 45 to the other parts are not shown because of their impertinence to the invention.

Figure 4:
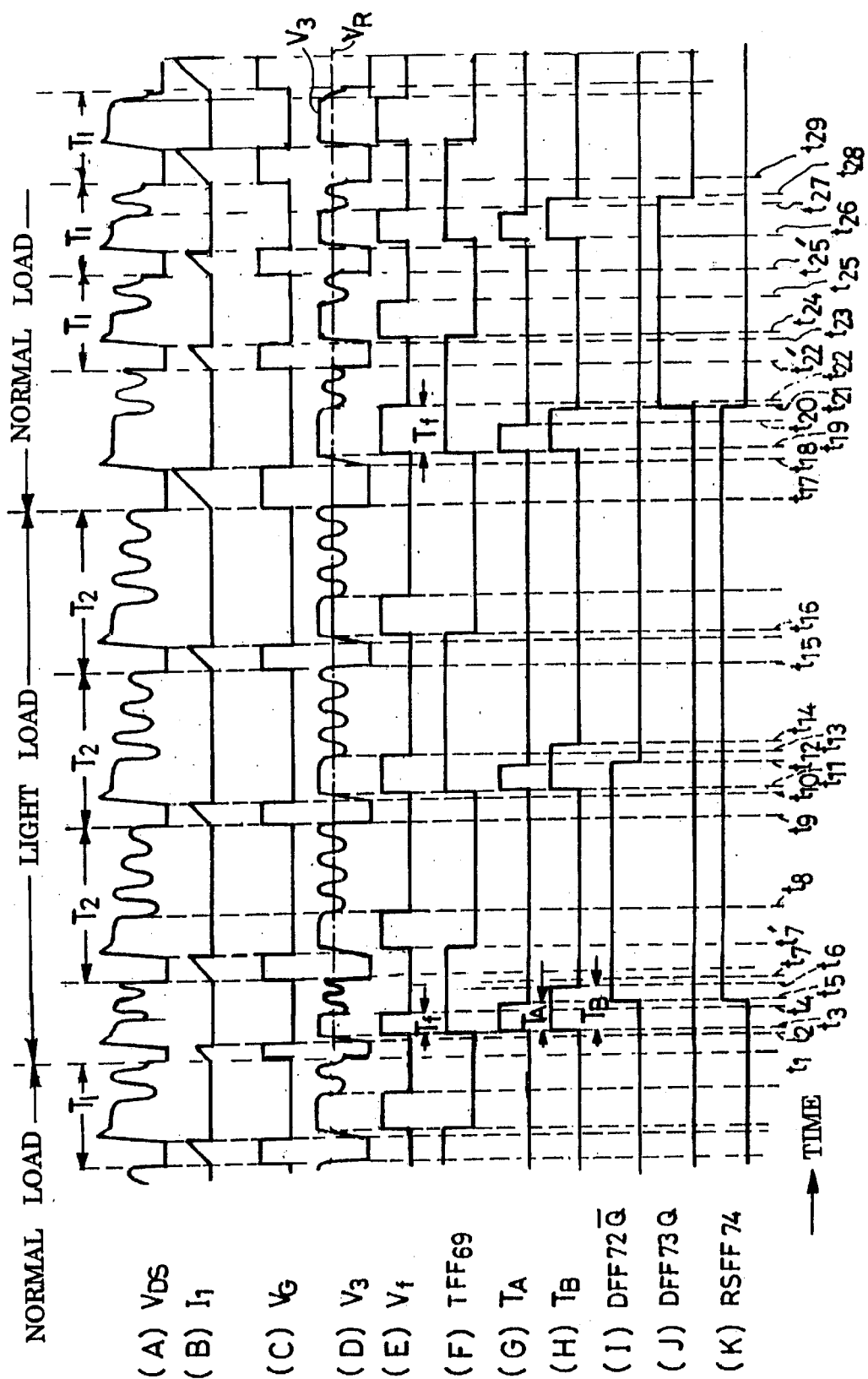
FIG. 4, consisting of (A) through (K), is a waveform diagram showing, in proper time relationship to one another, the waveforms appearing in various parts of the FIGS. 1–3 converter.

Referring more specifically to FIG. 4, it will be observed that the switching pulses $V_G$ issuing from the switch control circuit 7 as at (C) in this figure have two different periods $T_1$ and $T_2$, $T_1$ being less than $T_2$, depending upon whether the converter is under normal or light load. The switching pulses $V_G$ have the first period $T_1$, which corresponds to the 100 kHz output frequency of the VCO 42, when the output $RSFF_{74}$ from the load magnitude discriminator circuit 13 is low, indicating normal loading, as before $t_5$ and after $t_{21}$ as at (K) in FIG. 4. The switching pulses $V_G$ have the second period $T_2$, which corresponds to the 20 kHz output frequency of the VCO 42, when the output $RSFF_{74}$ from the load magnitude discriminator circuit 13 is high, indicating light loading, as from $t_5$ to $t_{21}$ as at (K) in FIG. 4. It is also to be noted in connection with FIG. 4 that the switching pulses $V_G$ are indefinite in period during the brief transient periods from normal to light loading and the other way around.

Figure 3:
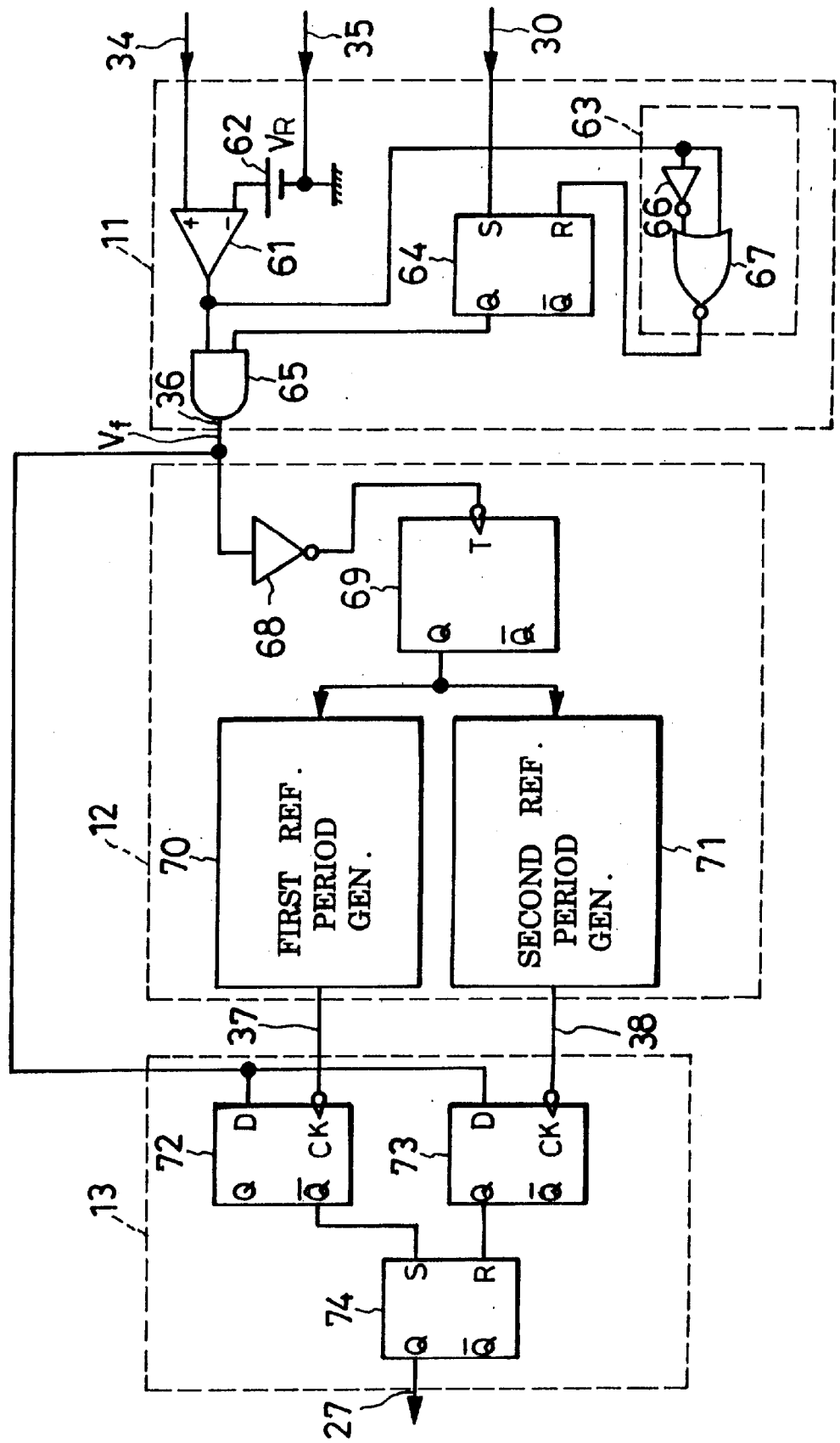
FIG. 3 is a schematic electrical diagram showing in more detail the flyback period determination circuit, reference period generator circuit, and load magnitude discriminator circuit of the FIG. 1 converter.
Figure 5:
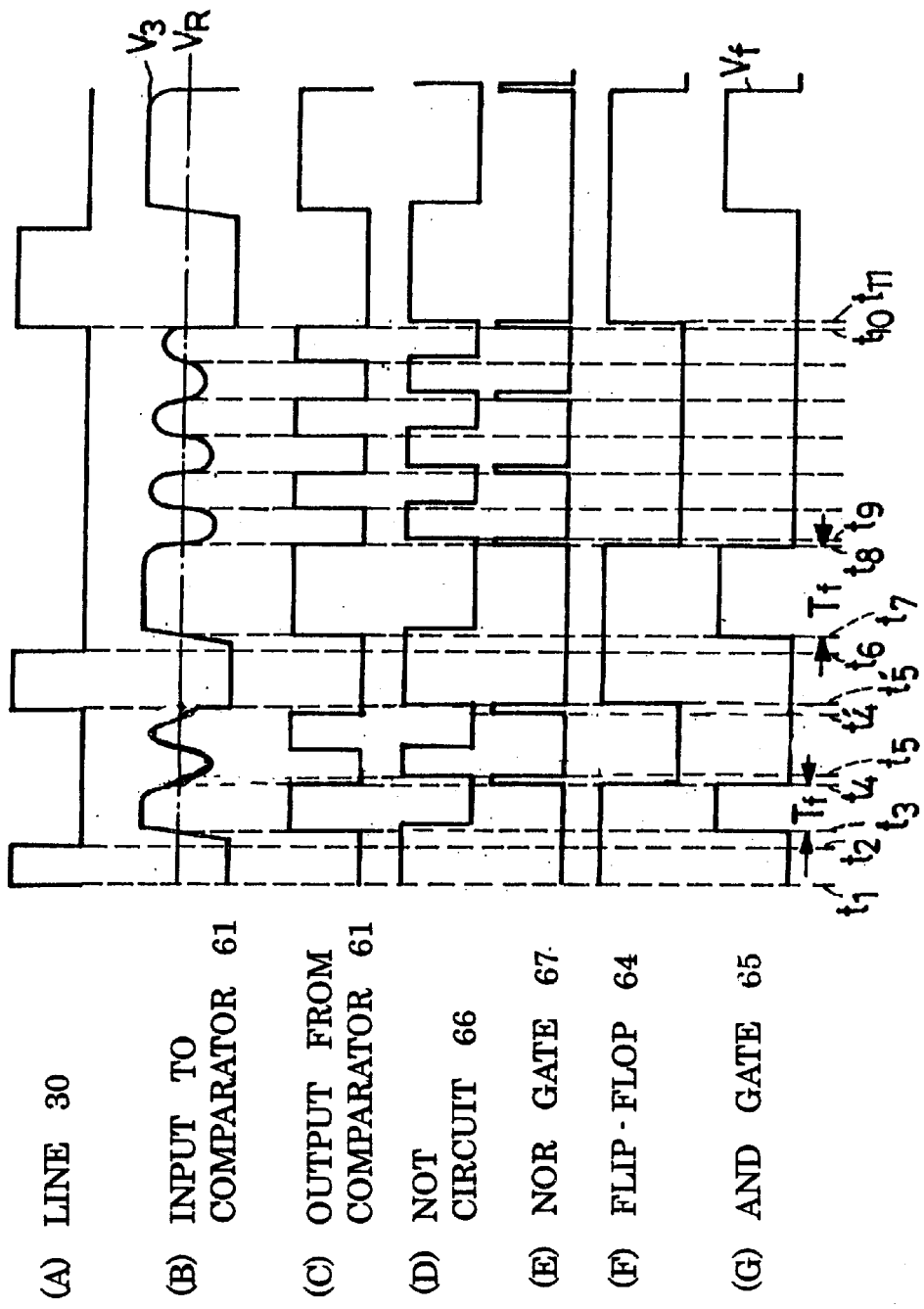
FIG. 5, consisting of (A) through (G), is a waveform diagram showing, in proper time relationship to one another, the waveforms appearing in various parts of the FIG. 1 flyback period determination circuit.

Reference may now be had to FIG. 3 for an inspection of the flyback period determination circuit 11, the reference period generator circuit 12, and the load magnitude discriminator circuit 13. The flyback period determination circuit 11 includes a comparator 61 having a positive input connected to one extremity of the transformer tertiary 17, FIG. 1, by way of a line 34, and a negative input connected to a reference voltage source 62. As indicated at (D) in FIG. 4 and at (B) in FIG. 5, the latter figure being explanatory of the operation of the flyback period determination circuit 11, the reference voltage $V_R$ from the source 62 is intermediate the maximum and the minimum instantaneous value of the voltage $V_3$, inclusive of flyback voltage, across the transformer tertiary 17. Since the reference voltage $V_R$ is shown to cross both flyback voltage and ringing voltage at (B) in FIG. 5, the comparator 61 will put out pulses during the flyback periods, as from $t_3$ to $t_4$, and from $t_7$ to $t_8$, and during the ensuing ringing periods, as at (C) in FIG. 5.

A pulse trailing edge detector circuit 63, another component of the flyback period determination circuit 11, comprises a NOT circuit 66 and a NOR gate 67. The NOR gate 67 has one input connected to the comparator 61 via the NOT circuit 66, and another input connected directly to the comparator 61. Inputting the FIG. 5(C) output from the comparator 61, the NOT circuit 66 puts out a phase inversion of the input with delay, as at (D) in FIG. 5. The NOR gate 67 inputs both this delayed inversion of the comparator output and the original output from the comparator and, as a results, puts out a series of short-duration pulses, as from $t_4$ to $t_5$, from $t_{4'}$ to $t_{5'}$, and from $t_8$ to $t_9$ as at (E) in FIG. 5. The leading edges of these NOR gate output pulses are in synchronism with the trailing edges of the output pulses of the comparator 61.

Still another component of the flyback period determination circuit 11 is an RS flip-flop 64 having a set input S connected by way of the line 30 to the output line 29, FIG. 1, of the switch control circuit 7, and a reset input R connected to the NOR gate 67. The resulting Q output from the flip-flop 64 is as depicted at (F) in FIG. 5, going low as from $t_4$ to $t_{5'}$ and from $t_8$ to $t_{11}$.

Also included in the flyback period determination circuit 11 is an AND gate 65 having one input connected to the comparator 61, and another input to the flip-flop 64. Thus, as indicated at (E) in FIG. 4 and (G) in FIG. 5, the AND gate 65 provides what may be called a flyback period signal $V_f$ indicative of the flyback period $T_f$. It is to be understood that by the term "flyback period" is meant only the period during which the energy that has been stored on the transformer 2 during each conducting period of the switch 3 is being released continuously in the course of the ensuing nonconducting period of the switch. The terms is therefore exclusive of the ringing periods such as from $t_8$ to $t_9$ and from $t_{13}$ to $t_{15}$ in FIG. 4 and from $t_8$ to $t_{10}$ in FIG. 5. The ringing is due to the inductance of the transformer 2 and the stray capacitances of the transformer and the switch 3.

With continued reference to FIG. 3 the reference period generator circuit 12 includes a T flip-flop 69 having an inverting trigger input T connected via a NOT circuit 68 to the output 36 of the flyback period determination circuit 11 for inputting the flyback period signal $V_f$. Therefore, triggered by the leading edges of the pulses contained in the flyback period signal $V_f$, as at $t_3$, $t_7$, $t_{11}$, $t_{16}$, $t_{19}$ and $t_{24}$ at (E) in FIG. 4, the flip-flop 69 will put out pulses as at $t_3$, $t_{11}$ and $t_{19}$ at (F) in FIG. 4. This flip-flop 69 is intended for positive detection of the starting moments of the flyback voltage no matter how brief it may be in duration.

The flip-flop 69 has its Q output connected to both first 70 and second 71 reference period generators. These generators 70 and 71 are both timers, putting out pulses having durations indicative of a first $T_A$ and a second $T_B$ reference period, as at (G) and (H) in FIG. 4, in response to the rises, as at $t_3$, $t_{11}$ and $t_{19}$, of the FIG. 4 (F) output pulses of the flip-flop 69. The first reference period $T_A$, represented by the $t_3$–$t_5$, $t_{11}$–$t_{12}$ and $t_{19}$–$t_{20}$ periods at (G) in FIG. 4, is set equal to the flyback period at the minimum of normal loading on the converter. Represented by the $t_3$–$t_6$, $t_{11}$–$t_{14}$ and $t_{19}$–$t_{20}$ periods at (H) in FIG. 4, on the other hand, the second reference period $T_B$ is set longer than the first $T_A$. The reference periods $T_A$ and $T_B$ are so determined that the load magnitude on the converter is judged hysteretically on the basis of the flyback period $T_f$. Generally, the difference in time between the two reference periods $T_A$ and $T_B$ can be arbitrary, but for the best results it may be from 0.1 to 10.0 microseconds or so.

According to the particular circuit design of FIG. 3, being triggered by the T flip-flop 69, the reference period generators 70 and 71 each produce a pulse of the $T_A$ or $T_B$ duration for every two on-off cycles of the switch 3. This is not an absolute requirement: Triggered instead by the AND gate 65 of the flyback period determination circuit 11, the reference period generators 70 and 71 may be made each to generate one reference period pulse for each on-off cycle of the switch 3.

The load magnitude discriminator circuit 13, shown also in FIG. 3, is designed to determine whether the converter is loaded normally or lightly, from comparison of the flyback period $T_f$ and the reference periods $T_A$ and $T_B$. It comprises two D flip-flops 72 and 73 and one RS flip-flop 74. Both D flip-flops 72 and 73 have their data inputs D connected to the output 36 of the flyback period determination circuit 11. The first D flip-flop 72 has its phase-inverting clock input CK connected to the first reference period generator 70 of the reference period generator circuit 12, and the second D flop-flop 73 has its phase-inverting clock input CK connected to the second reference period generator 71.

It is thus seen that the first D flip-flop 72 takes in the flyback period signal $V_f$, at (E) in FIG. 4, at the trailing edges of the output pulses of the first reference period generator 70, as at $t_5$, $t_{12}$, and $t_{20}$ at (G) in FIG. 4. For instance, the flyback period signal $V_f$ is low at $t_5$, so that the inverting output of the first D flip-flop 72 will go high as at (I) in FIG. 4. The flyback period from $t_{11}$ to $t_{13}$ in FIG. 4 is shown to be longer than the first reference period $T_A$, from $t_{11}$ to $t_{12}$, because of a drop in switching frequency in light load mode of operation. Therefore, as indicated at (I) in FIG. 4, the inverting output of the first D flip-flop 72 goes low at $t_{12}$.

The second D flip-flop 73 of the load magnitude discriminator circuit 13 takes in the flyback period signal $V_f$, at the trailing edges of the output pulses of the second reference period generator 71 of the reference period generator circuit 12, as at $t_6$, $t_{14}$ and $t_{21}$ at (H) in FIG. 4. The flyback period signal $V_f$ is low at $t_6$ and $t_{14}$, with the result that the noninverting output of the second D flip-flop 73 remains low as at (J) in FIG. 4. The noninverting output of this flip-flop 73 does, however, go high at $t_{21}$ because then the flyback period signal $V_f$ is high.

It will have been noted that the two D flip-flops 72 and 73 of the load magnitude discriminator circuit 13 are clocked by the trailing edges of the output pulses of the reference period generators 70 and 71, respectively, of the reference period generator circuit 12. These trailing edges of the output pulses of the generators 70 and 71 indicate the lapse of the predefined reference periods $T_A$ and $T_B$, respectively, from the moments of appearance of the flyback voltage $V_f$.

The RS flip-flop 74, the final component of the FIG. 3 load magnitude discriminator circuit 13, has a set input S connected to the inverting output of the first D flip-flop 72, and a reset input R connected to the noninverting output of the second D flip-flop 73. The Q output of the RS flip-flop 74 goes high at $t_5$, as at (K) in FIG. 4, when the inverting output of the first D flip-flop 72 goes high as at (I) in FIG. 4. Thereafter, when the noninverting output of the second D flip-flop 73 goes high at $t_{21}$, as at (J) in FIG. 4, the RS flip-flop 74 will be reset, with the result that its noninverting output goes low at $t_{21}$, as at (k) in FIG. 4. The low state of the RS flip-flop 74, both before $t_5$ and after $t_{21}$ in FIG. 4, indicates normal loading on the converter whereas its high state, from $t_5$ to $t_{21}$, indicates light loading on the converter. This output from the RS flip-flop 74 will be hereinafter referred to as the load magnitude discrimination signal.

It must again be pointed out at this juncture that the reference period generator circuit 12 and load magnitude discriminator circuit 13 of the illustrated circuit configurations are intended to ascertain the load magnitude hysteretically, as will be explained in more detail hereinbelow. Let it be assumed that the load magnitude were determined solely by the first reference period generator 70 and the first D flip-flop 72. Then the FIG. 4 (I) output from the D flip-flop 72 would be the load magnitude discrimination signal. If, in the case assumed now, the conducting periods of the switch 3 diminished, as from $t_1$ to $t_2$ at (C) in FIG. 4, with a gradual decrease in the power requirement of the load, the flyback period $T_f$ would become shorter, as from $t_3$ to $t_4$ at (E) in FIG. 4. The inverting output of the D flip-flop 72 would go high as at $t_5$ at (I) in FIG. 4, indicating that the converter is loaded lightly. The switching frequency would then drop for operation in light load mode, as from 100 kHz to 20 kHz. The consequent decrease in the duty ratio of the switch 3 would invite a decrease in the converter output voltage $V_o$. Thereupon the switching pulses $V_G$, FIG. 4(C), would increase in duration, as from $t_9$ to $t_{10}$, in comparison with the pulse from $t_1$ to $t_1$, so that the flyback period $T_f$ would become longer than the first reference period $T_A$, as from $t_{11}$ to $t_{13}$ at (E) in FIG. 4.

Thus the inverting output of the D flip-flop 72 would go low at $t_{12}$, as at (I) in FIG. 4, indicating normal loading when actually the converter is loaded lightly. As has been mentioned, this flip-flop output would be the load magnitude discrimination signal in the absence of the second reference period generator 71, second D flip-flop 73, and RS flip-flop 74. The result would be the hunting of the control system, with the normal and light load modes of operation repeating themselves alternately. Such reiteration of the two operating modes would also cause the on-off cycles of the switch 3 to become irregular, as from $t_1$ to $t_4$, and from $t_{17}$ to $t_{22}$, in FIG. 4, resulting in the production of noise that would be difficult of removal by a noise filter. An additional result would be the instability of the converter output voltage $V_o$.

Contrastively, according to the hysteretic load magnitude discriminator circuit 13, the RS flip-flop 74 will not respond to the $t_{12}$ change, at (I) in FIG. 4, in the output state of the first D flip-flop 72, remaining high as at (k) in the same figure. Thus, once the flyback period $T_f$ first becomes shorter than the first reference period $T_A$, as from $t_3$ to $t_4$ in FIG. 4, no change will occur in the output from the load magnitude discriminator circuit 13 even if the flyback period subsequently grows longer than the first reference period as a result of switching. Only when the flyback period $T_f$ becomes longer than the second reference period $T_B$ will a change occur in the result of load discrimination by the RS flip-flop 74, as at $t_{21}$ in FIG. 4.

Similarly, after the converter has been set in normal load mode at $t_{21}$, in which the switch 3 is turned on and off with the first period $T_1$, no change in mode will take place when the flyback period $T_f$ grows so short, as from $t_{26}$ to $t_{27}$ at (E) in FIG. 4, and less than the second reference period $T_B$, seen from $t_{26}$ to $t_{28}$ at (H) in the same figure. A transition to light load mode will occur thereafter when the flyback period $T_f$ becomes less than the first reference period $T_A$, as from $t_3$ to $t_4$. The hysteresis of the load magnitude discriminator circuit 13 gains the same advantages as does that of a comparator or Schmidt trigger circuit.

The FIG. 3 load magnitude discriminator circuit 13 has its output connected as aforesaid to the FIG. 2 switch control circuit 7, or to the mode selector circuit 44 shown included therein. The first switch 49 of this mode selector circuit 44 will be opened, and the second switch 51 closed, when the RS flip-flop 74 of the load magnitude discriminator circuit 13 goes high at $t_5$ as at (K) in FIG. 4. The VCO 42 will thus have its output frequency set at 20 kHz, with the result that the comparator 41 puts out switching pulses $V_G$, FIG. 4 (C), with the second period $T_2$. On the other hand, when the RS flip-flop 74 of the load magnitude discriminator circuit 13 goes low at $t_{21}$, as at (K) in FIG. 4, the first switch 49 of the mode selector circuit 44 will be closed, and the second switch 51 opened. Thereupon the VCO 42 will have its output frequency switched to 100 kHz, resulting in the production of switching pulses from the comparator 41 with the second period $T_1$.

With the switch 3 thus turned on and off by the switching pulses $V_G$, there will be the flow of current $I_1$ as at (B) in FIG. 4, through the path comprising the power supply 1, transformer primary 15, and switch 3 during each conducting period of this switch. Since the transformer primary 15 is inductive, the current $I_1$ will rise in magnitude with a gradient. The transformer 2 will store energy as a result of such current flow as the diodes 18 and 32 are both nonconductive during the conducting periods of the switch 3, because the transformer secondary 16 and tertiary 17 are both opposite in polarity to the primary 15. The stored energy will be liberated upon subsequent nonconduction of the switch 3, resulting in the development of a flyback voltage. The diodes 18 an 32 will both conduct, permitting the capacitors 19 and 33 to be charged.

The LED 25, FIG. 1, of the output voltage detector circuit 6 will glow with intensity proportional to the converter output voltage $V_o$ being applied to the load 20, irradiating the phototransistor 47. FIG. 2, of the voltage feedback circuit 40. The resistance of this phototransistor 47 will lower when the output voltage $V_o$ grows higher than a target range. The lower resistance of the phototransistor will make higher the potential at the junction 48 between the phototransistor and the resistor 46. Receiving this higher potential into its negative input, the comparator 41 will put out switching pulses of shorter durations. The switch 3 will then conduct for shorter periods of time to lower until the output voltage $V_o$ drops to the target range. The reversal of such operation will take place when the output voltage $V_o$ falls below the target range.

Such being the construction and operation of the FIG. 1 converter, the advantages gained by this particular embodiment of the invention may be recapitulated as follows:

1. Whether the converter is being loaded normally or lightly is accurately discernible by the load magnitude discriminator circuit 13 in cooperation with the flyback period determination circuit 11 and reference period generator circuit 12, in order to save power under light load.

2. The load magnitude is ascertained by hysteretic comparison of the flyback period $T_f$ and the two reference periods of time $T_A$ and $T_B$, so that a switching between the two modes of converter operation is stably accomplished even in the event of a gradual change in load magnitude. Consequently, not only will the converter output voltage be stabilized in both modes of operation, but also the switching frequency can be kept free from unpredictable, indefinite changes. The magnetostrictive noise of the transformer is therefore more easily suppressible than heretofore.

3. The flyback period determination circuit 11, reference period generator circuit 12, and load magnitude discriminator circuit 13 can all be mostly comprised of logic circuitry and so is capable of fabrication in the form of integrated circuits.

Figure 6:
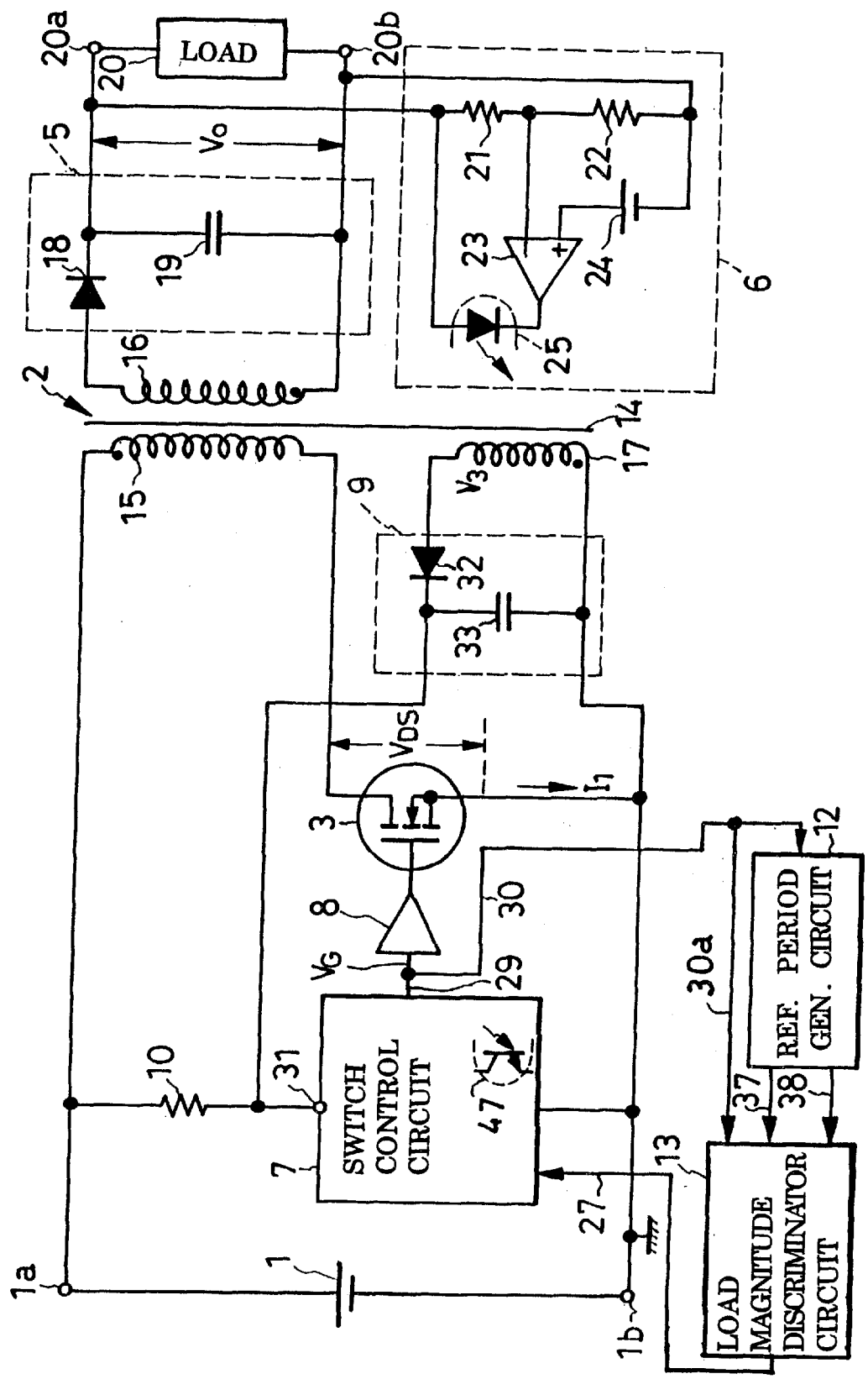
FIG. 6 is a diagram similar to FIG. 1 but showing a second preferred form of d.c.-to-d.c. converter according to the invention.
Figure 7:
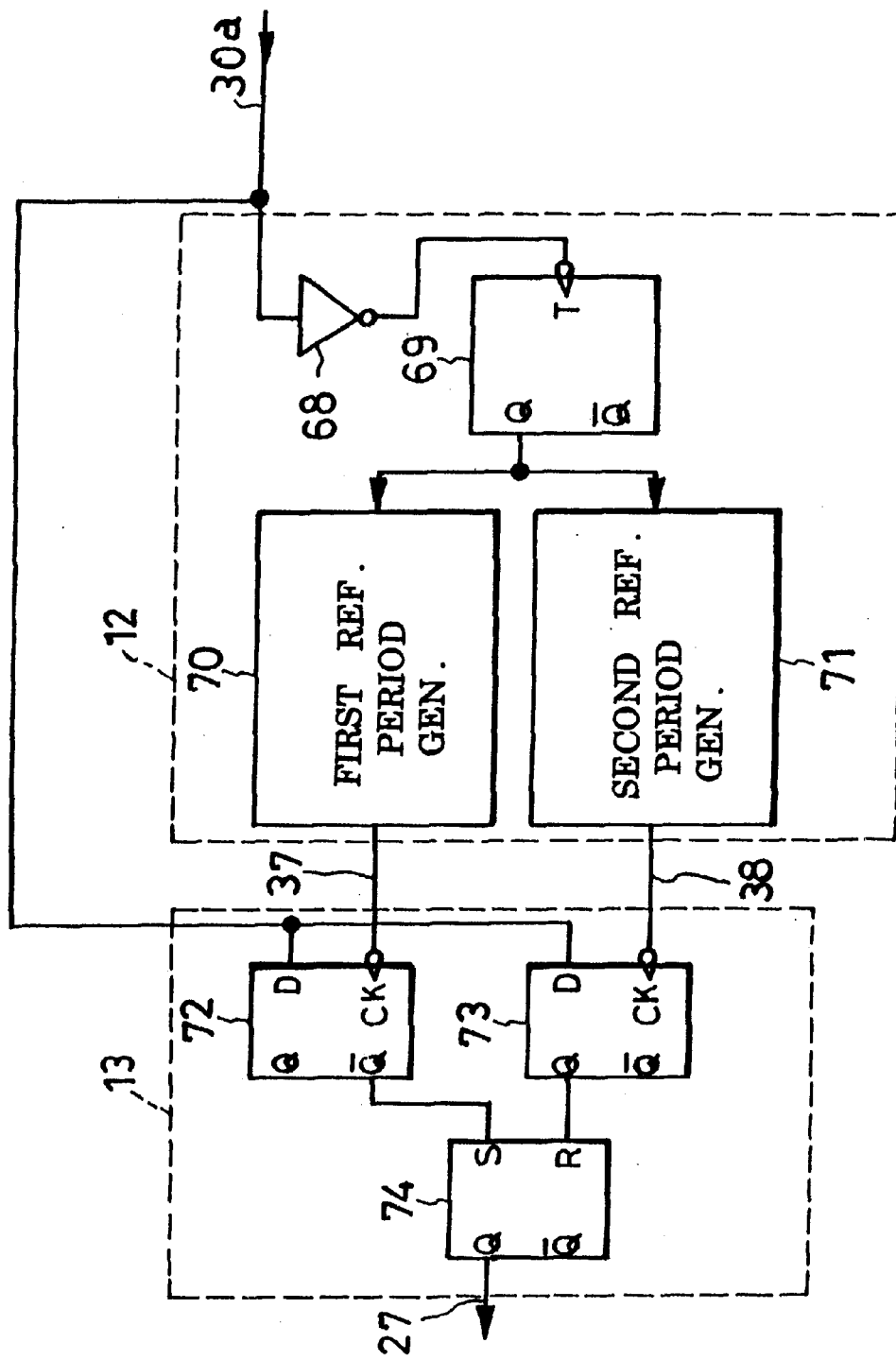
FIG. 7 is a schematic electrical diagram showing in more detail the reference period generator circuit and load magnitude discriminator circuit of the FIG. 6 converter.
Figure 8:
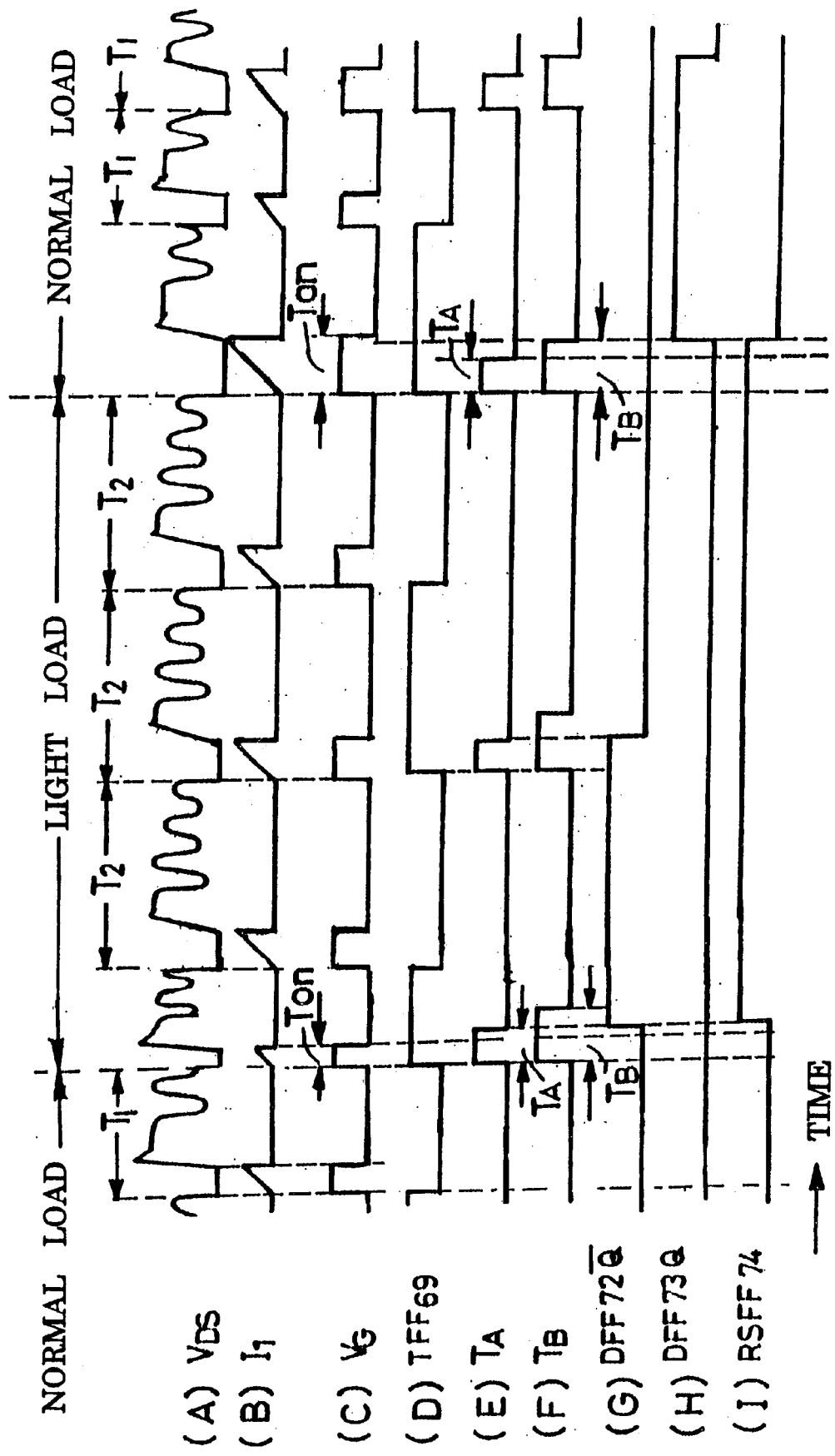
FIG. 8, consisting of (A) through (I), is a waveform diagram showing, in proper time relationship to one another, the waveforms appearing in various parts of the FIGS. 6 and 7 converter.

Embodiment of FIGS. 6–8

An alternate form of d.c.-to-d.c. converter according to the invention is shown in its entirety in FIG. 6. FIG. 7 is a more detailed illustration of its reference voltage generator circuit 12 and load magnitude discriminator circuit 13, and FIG. 8 a waveform diagram explanatory of its operation. A comparison of FIGS. 1 and 6 will reveal that this FIG. 6 converter differs from that of FIG. 1 in having no flyback period determination circuit 11; instead, the switch control circuit 7 is connected directly to the load magnitude discriminator circuit 13 by way of a line 30a besides being connected to the reference period generator circuit 12 by way of the line 30. The FIG. 6 converter is akin to that of FIG. 1 in all the other details of construction.

With reference to FIG. 7 the reference voltage generator circuit 12 and load magnitude discriminator circuit 13 are identical in construction with those shown in FIG. 3; only, the NOT circuit 68 and the data inputs D of the D flip-flops 72 and 73 are connected to the switch control circuit 7 by way of the line 30a. This line is intended for delivery of the switching pulses $V_G$ to the noted circuit elements 68, 72 and 73 in order to enable the same to know the conducting periods $T_{on}$, at (C) in FIG. 8, of the switch 3.

In operation, in the FIG. 7 reference period generator circuit 12, the T flip-flop 69 will put out a series of pulses $TFF_{69}$, FIG. 8(D), in response to the switching pulses $V_G$, FIG. 8(C), each having a duration $T_{on}$. Each output pulse $TFF_{69}$ of the flip-flop 69 rises with the appearance of every other switching pulse $V_G$. Inputting these pulses $TFF_{69}$, the reference period generators 70 and 71 will provide pulses shown at (E) and (F) in FIG. 8, each rising with one flip-flop output pulse and lasting the preassigned reference period $T_A$ or $T_B$, for delivery to the load magnitude discriminator circuit 13.

Clocked by the trailing edges of the output pulses of the reference period generators 70 and 71, respectively, the D flip-flops 72 and 73 of the load magnitude discriminator circuit 13 will take in the switching pulse signal $V_G$. The resulting outputs from these flip-flops 72 and 73 are as shown at (G) and (H) in FIG. 8. Essentially, therefore, the flip-flops 72 and 73 functions to determine whether each conducting period $T_{on}$ of the switch 3 is shorter or longer than the two preassigned periods $T_A$ and $T_B$. The RS flip-flop 74 is set and reset by the leading edges of the FIG. 8(G) and (H) output pulses of the D flip-flops 72 and 73, respectively, and provides the output seen at (I) in FIG. 8.

The conducting periods $T_{on}$, at (C) in FIG. 8, of the switch 3 are in proportion with the flyback period $T_f$, at (E) in FIG. 4. Whether the converter is loaded normally or lightly is therefore ascertainable from a comparison of the switch conducting periods $T_{on}$ and the reference periods $T_A$ and $T_B$ as in the foregoing.

Figure 9:
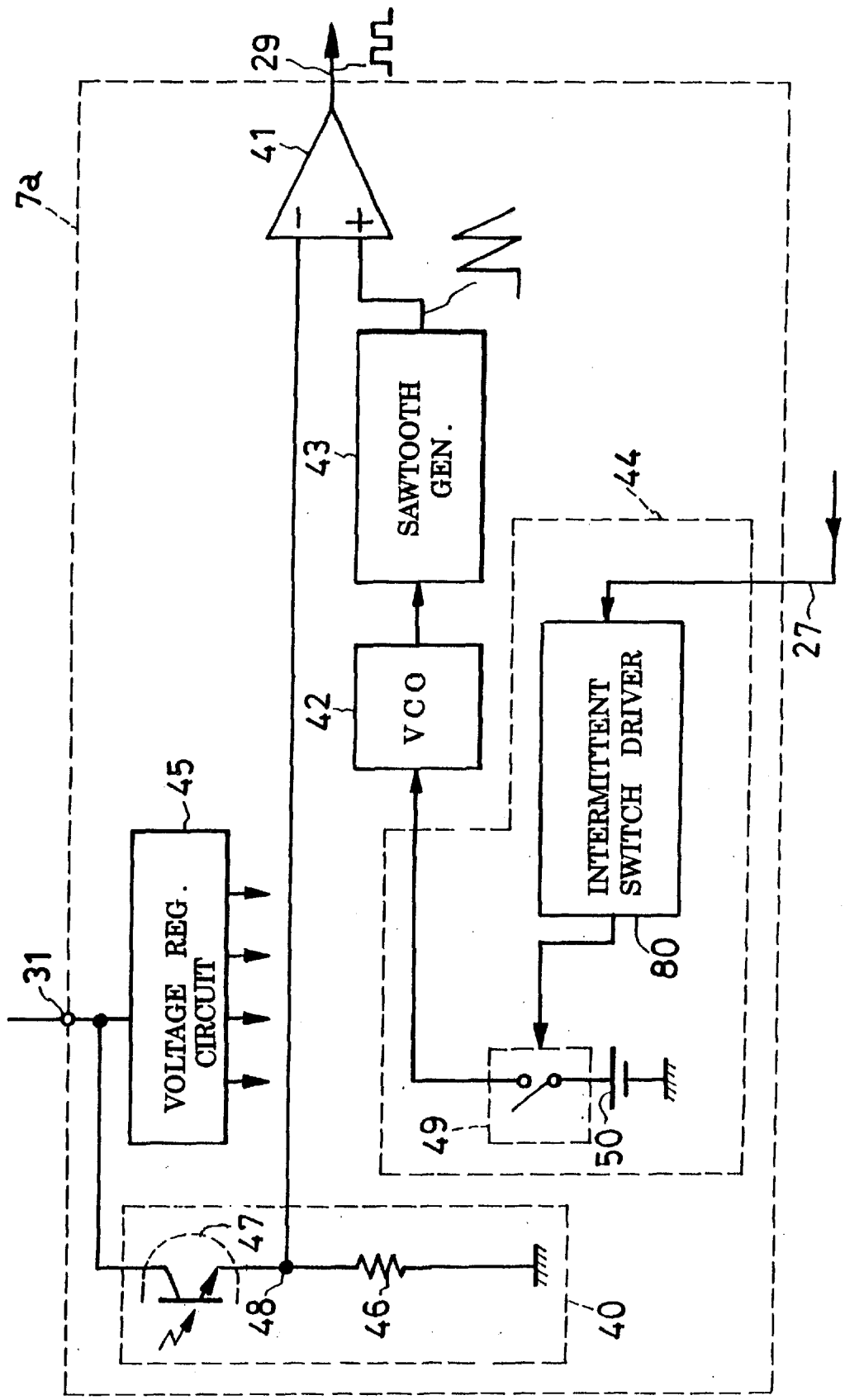
FIG. 9 is a diagram similar to FIG. 1 but showing a third preferred form of d.c.-to-d.c. converter according to the invention.
Figure 10:
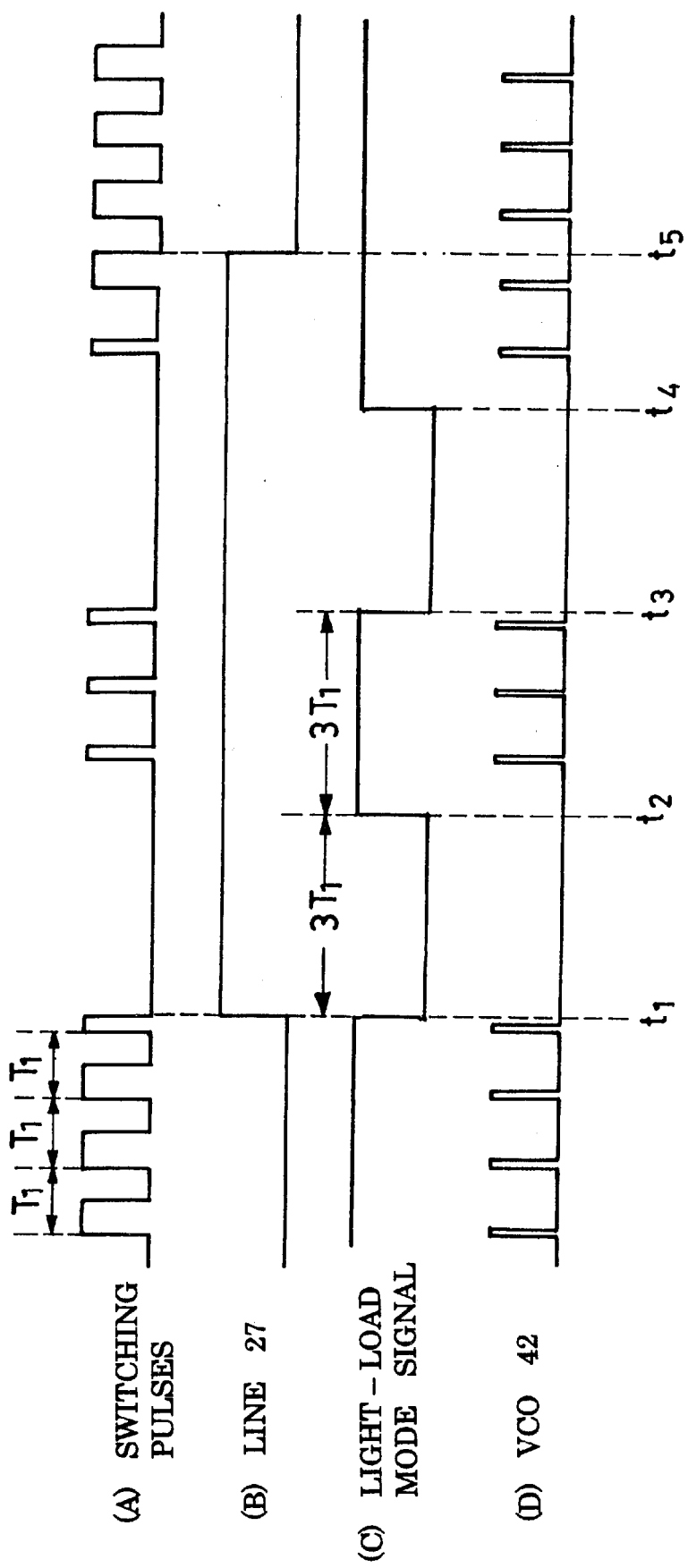
FIG. 10, consisting of (A) through (D), is a waveform diagram showing, in proper time relationship to one another, the waveforms appearing in various parts of the FIG. 9 converter.

Embodiment of FIGS. 9 and 10

The switch control circuit 7 of the FIG. 1 converter, shown in detail in FIG. 2, is modifiable as indicated at 7a in FIG. 9. The modified switch control circuit 7a differs from its FIG. 2 counterpart 7 in not having the second switch 51 and second voltage source 52 possessed by the latter but in having, instead, an intermittent switch driver circuit 80. Connected between the load magnitude discriminator circuit 13, shown in detail in FIG. 3, and the switch 49, the intermittent switch driver circuit 80 turns this switch on at prescribed time intervals for intermittent converter operation under light load.

The intermittent switch driver circuit 80 provides the light-load mode signal shown at (C) in FIG. 10. As will be understood upon comparison of (B) and (C) in this figure, the light-load mode signal stays high as long as the load magnitude discrimination signal is low, indicating normal loading, as before $t_1$ and after $t_5$. When the load magnitude discrimination signal is high, on the other hand, the light-load mode signal takes the form of a series of discrete pulses each having a duration longer than the period $T_1$ of the switching pulses, FIG. 10(A), applied to the switch 3. The durations of the output pulses, as well as the spacings therebetween, of the intermittent switch drive circuit 80 during light-load operation are each shown to be three times longer than the switching pulse period $T_1$ in this particular embodiment of the invention. These pulses are applied to the control input of the switch 49 for closing the same at regular intervals.

Powered intermittently by the power supply 50 when the converter is under light load, the VCO 42 will generate pulses as from $t_2$ to $t_3$ and from $t_4$ to $t_5$ as at (D) in FIG. 10. The average number of switchings per unit length of time during the $t_1$–$t_5$ light-load operation of FIG. 10 is therefore less than that during the pre-$t_1$ and post-$t_5$ normal-mode operation, with consequent reduction in switching loss.

Figure 11:
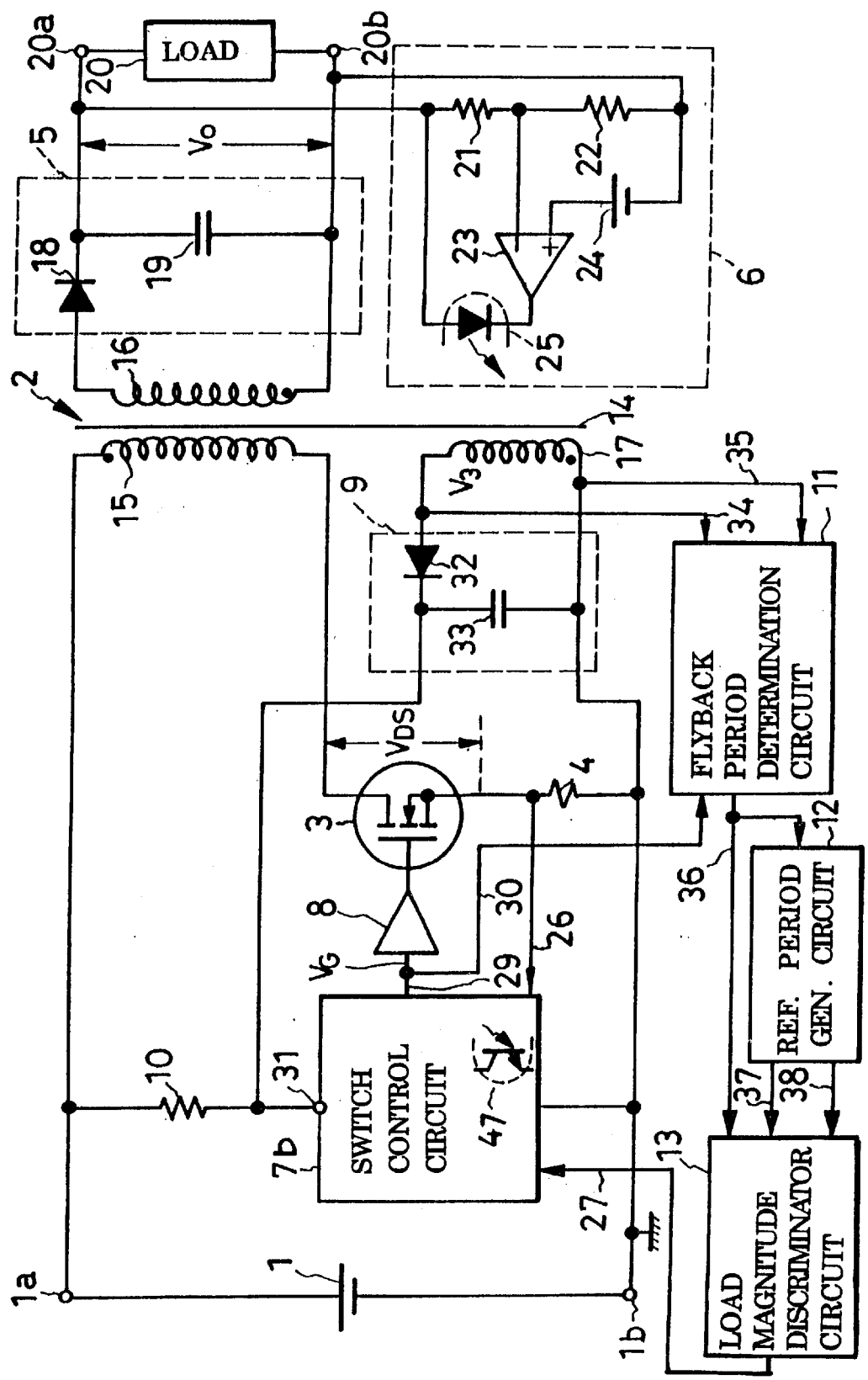
FIG. 11 is a diagram similar to FIG. 1 but showing a fourth preferred form of d.c.-to-d.c. converter according to the invention.
Figure 12:
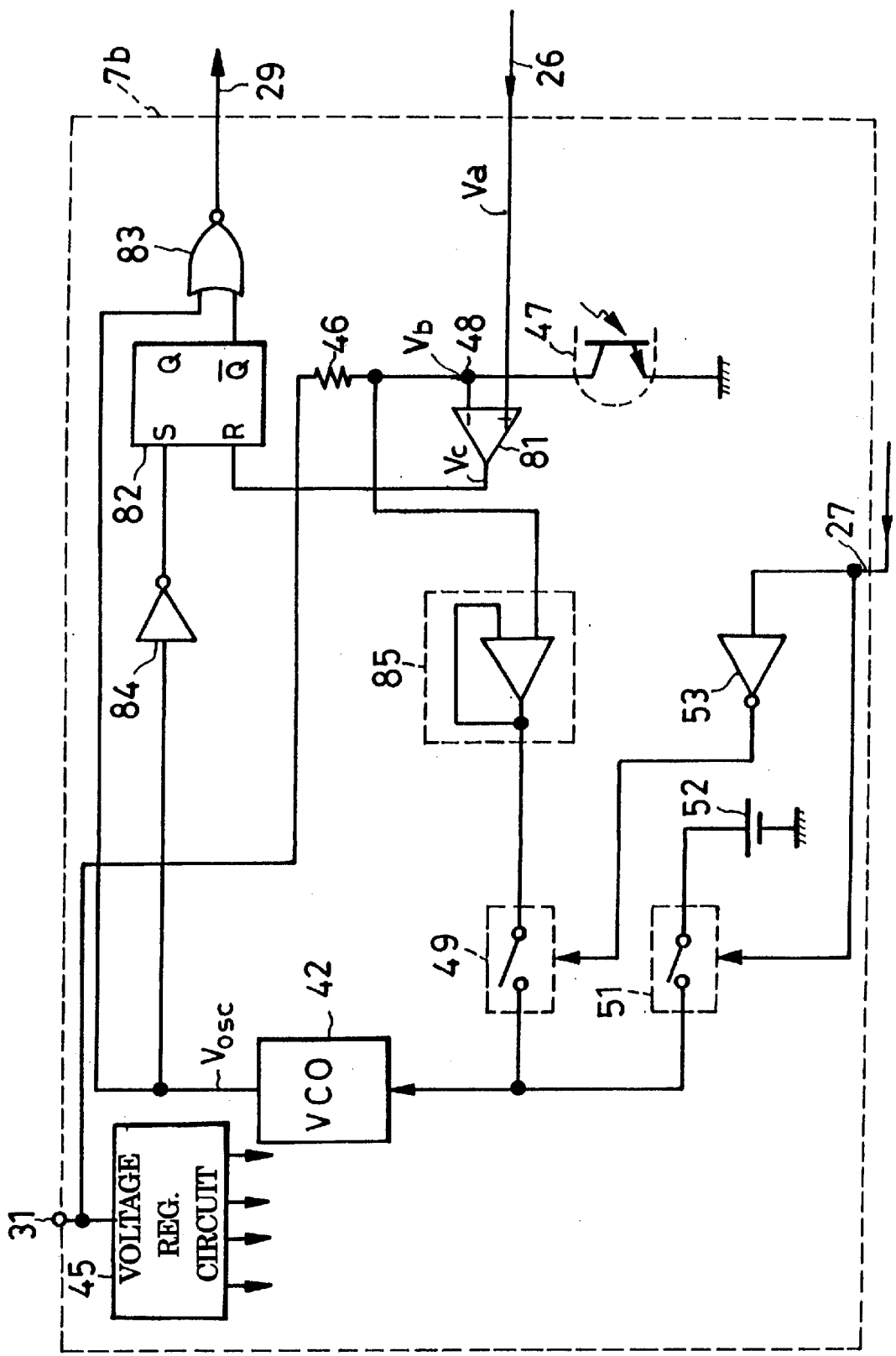
FIG. 12 is a schematic electrical diagram showing in more detail the switch control circuit of the FIG. 11 converter.
Figure 13:
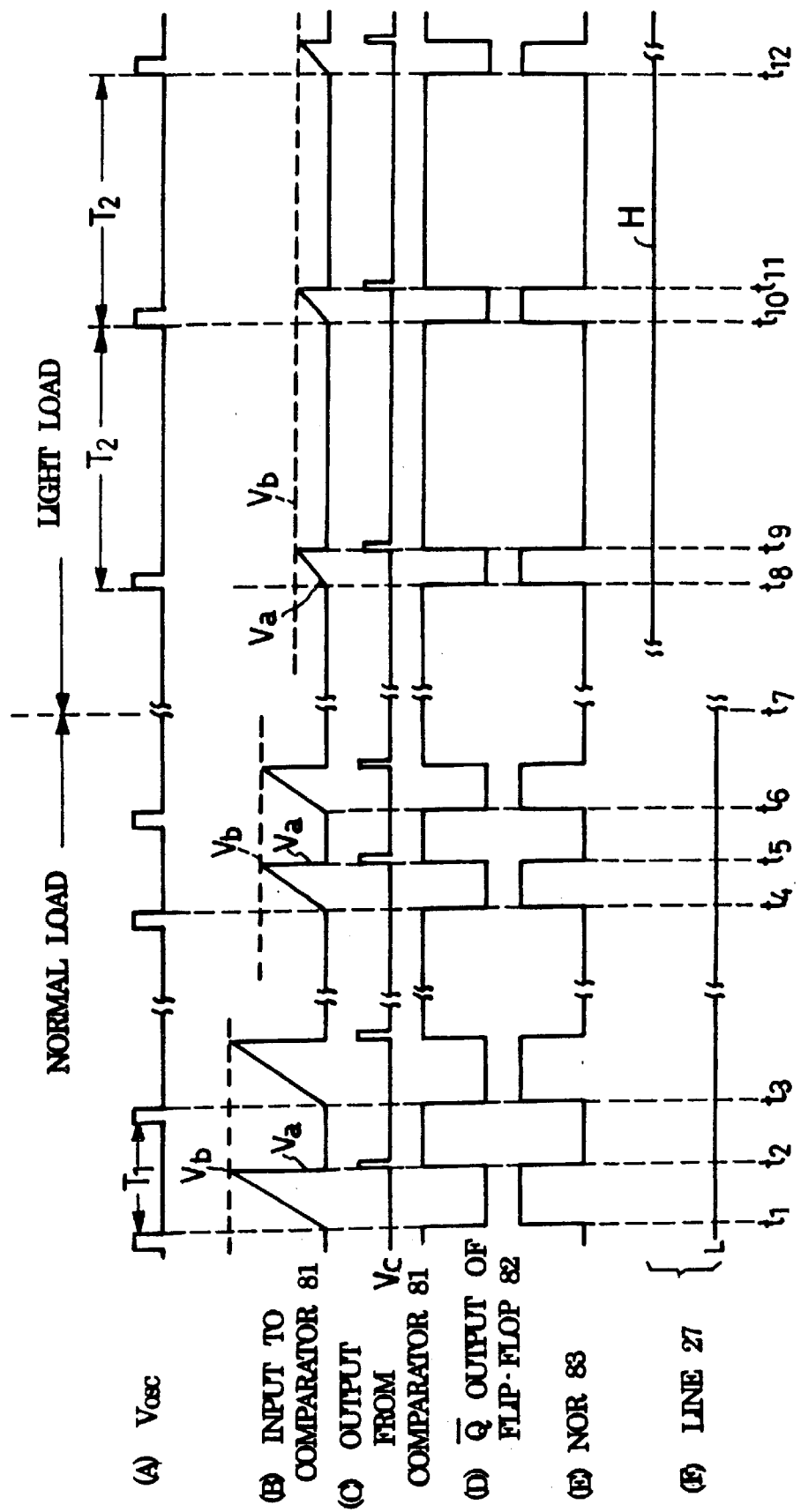
FIG. 13, consisting of (A) through (F), is a waveform diagram showing, in proper time relationship to one another, the waveforms appearing in various parts of the FIG. 12 switch control circuit.

Embodiment of FIGS. 11–13

The d.c.-to-d.c. converter of FIG. 11 features another modified switch control circuit 7b, shown in detail in FIG. 12, and a resistor 4 connected between the switch 3 and the grounded supply terminal 1b for detection of the current flowing through the switch. The junction between switch 3 and resistor 4 is connected by way of a line 25 to the second modified control circuit 7b. All the other details of construction are as previously set forth in connection with the FIG. 1 converter.

The second modified switch control circuit 7b is designed for converter operation both in normal load mode, in which the switching frequency rises in inverse proportion to the load, as in the familiar ringing choke converter, and in light load mode in which the switching frequency is less than in normal load mode.

Referring more specifically to FIG. 12, the switch control circuit 7b comprises a comparator 81, an RS flip-flop 82, a NOR gate 83, a NOT circuit 84 and an amplifier circuit 85, in addition to the various other circuit elements that exist in the FIG. 2 switch control circuit 7 and that therefore are identified by the same reference numerals. The comparator 81 has its positive input connected by way of the line 26 to the junction between switch 3 and resistor 4, in order to be supplied with the switch current signal having a voltage $V_a$ proportional to the magnitude of the current flowing through the switch. The negative input of the comparator 81 is connected to the junction 48 between resistor 46 and phototransistor 47. The resistor 46 has one extremity connected to the supply terminal 31, and the other extremity grounded via the phototransistor 47. This phototransistor is optically coupled as aforesaid to the LED 25, FIG. 11, of the output voltage detector circuit 6. The junction 48 is additionally connected to the amplifier circuit 85.

There is obtained at the junction 48 between resistor 46 and phototransistor 47 the voltage feedback signal having a voltage $V_b$ which represents the division of the supply voltage by the resistor 46 and phototransistor 47. The voltage $V_b$ is in inverse proportion to the converter output voltage $V_o$. Comparing the switch current signal $V_a$ and the voltage feedback signal $V_b$ as at (B) in FIG. 13, the comparator 81 provides the output $V_c$ as at (C) in the same figure.

The VCO 42 is connected to the amplifier circuit 85 via the first switch 49 and to the power supply 52 via the second switch 51. As in the FIG. 2 switch control circuit 7, the switches 49 and 51 are alternately turned on and off by the load magnitude discrimination signal supplied from the load magnitude discriminator circuit 13, FIG. 11, over the line 27. Therefore, in normal load mode, the VCO 42 will generate the pulses $V_{OSC}$ of the variable period $T_1$, as from $t_1$ to $t_7$ at (A) in FIG. 13, in response to the output from the amplifier circuit 85. In light load mode, on the other hand, the VCO 42 will respond to the supply voltage from the source 52, generating the pulses of the constant period $T_2$, as from $t_7$ to $t_{12}$ at (A) in FIG. 13. These output pulses of the VCO 42 are applied both to the RS flip-flop 82 via the NOT circuit 84 and directly to the NOR gate 83.

The RS flip-flop 82 has a set input S connected to the VCO 42 via the NOT circuit 84, a reset input R connected to the comparator 81, and an inverting output $\overline{Q}$ connected to the NOR gate 83. This NOR gate 83 has its output connected by way of the line 29 to the switch driver circuit 8, FIG. 11. The flip-flop 82 provides the signal seen at (D) in FIG. 13, and the NOR gate 83 the switching pulses seen at (E) in the same figure.

The first switch 49 will be on, and the second switch 51 off, when the load magnitude discrimination signal on the line 27 is low, indicating normal loading, as from $t_1$ to $t_7$ in FIG. 13. The VCO 42 will then put out clock pulses $V_{OSC}$, as at (A) in FIG. 13, with a repetition frequency proportional to the output from the amplifier circuit 85. Having the set input S connected to the VCO 42 via the NOT circuit 84, the flip-flop 82 will be triggered by the trailing edges of the FIG. 13(A) output pulses of the VCO 42. The flip-flop 82 will therefore be set as at $t_1$, $t_4$ and $t_6$ in FIG. 13, with its inverting output going low as at (D) in the same figure. An inspection of (A) and (D) in FIG. 13 will reveal that both inputs to the NOR gate 83 are low as from $t_1$ to $t_2$, and from $t_4$ to $t_5$, so that its output will be high during these periods, as at (E) in FIG. 13. These output pulses of the NOR gate 83 constitute the switching pulses $V_G$ to be applied to the gate of the FET switch 3, FIG. 11, via the switch driver circuit 8.

It will also be observed from (C), (D) and (E) in FIG. 13 that the switch 3 is held closed until the flip-flop 82 is reset by the output $V_c$ from the comparator 81. During each such conducting period of the switch 3 a current will flow through the serial circuit of the switch 3, resistor 4 and transformer primary 15 with rapidly increasing magnitude due to the inductance of the transformer primary. There will thus be obtained across the resistor 4 the switch current signal $V_a$ indicated at (B) in FIG. 13. Inputting this switch current signal $V_a$ and the voltage feedback signal $V_b$, the comparator 81 of the switch control circuit 7b will put out a pulse each time the switch current signal rises to the level of the voltage feedback signal, as at $t_2$ and $t_5$ at (C) in FIG. 13. Each such pulse will reset the flip-flop 82, as at (D) in FIG. 13, and so terminate one conducting period of the switch 3, as at (E) in the same figure.

The magnitude of the voltage feedback signal $V_b$ is in proportion to the power consumption of the load 20, and so are the length of time during which the flip-flop 82 stays set, and the duration of each output pulse of the NOR gate. The on-off frequency of the switch 3 is in inverse proportion to the power consumption of the load 20.

The first switch 49 of the FIG. 12 switch control circuit 7b will be off, and the second switch 51 on, when the load magnitude discrimination signal on the output line 27 of the load magnitude discriminator circuit 13 is high, indicating light loading as from $t_8$ to $t_{12}$ in FIG. 13. Powered by the constant voltage from the source 52, the VCO 42 will generate pulses at a constant repetition frequency as at (A) in FIG. 13. The period $T_2$ of these constant frequency pulses in light load mode is less than the maximum period $T_1$ of those in normal load mode before $t_7$. Converter operation in light load mode is analogous with that in normal load mode except that the switch 3 is driven with a constant on-off period $T_2$.

Thus the FIG. 11 converter 11 relies on the flyback voltage for finding whether it is under normal or light load, and switchings per unit length of time are reduced in light load mode for higher efficiency. The judgment of load magnitude by the load magnitude discriminator circuit 13 is done hysteretically as in the FIG. 1 converter. The FIG. 11 converter is further modifiable to ascertain load magnitude by comparison of the durations of the switching pulses $V_G$ at (E) in FIG. 13 and the two reference periods of time $T_A$ and $T_B$ seen in FIG. 8, as in the second disclosed embodiment of the invention.

Figure 14:
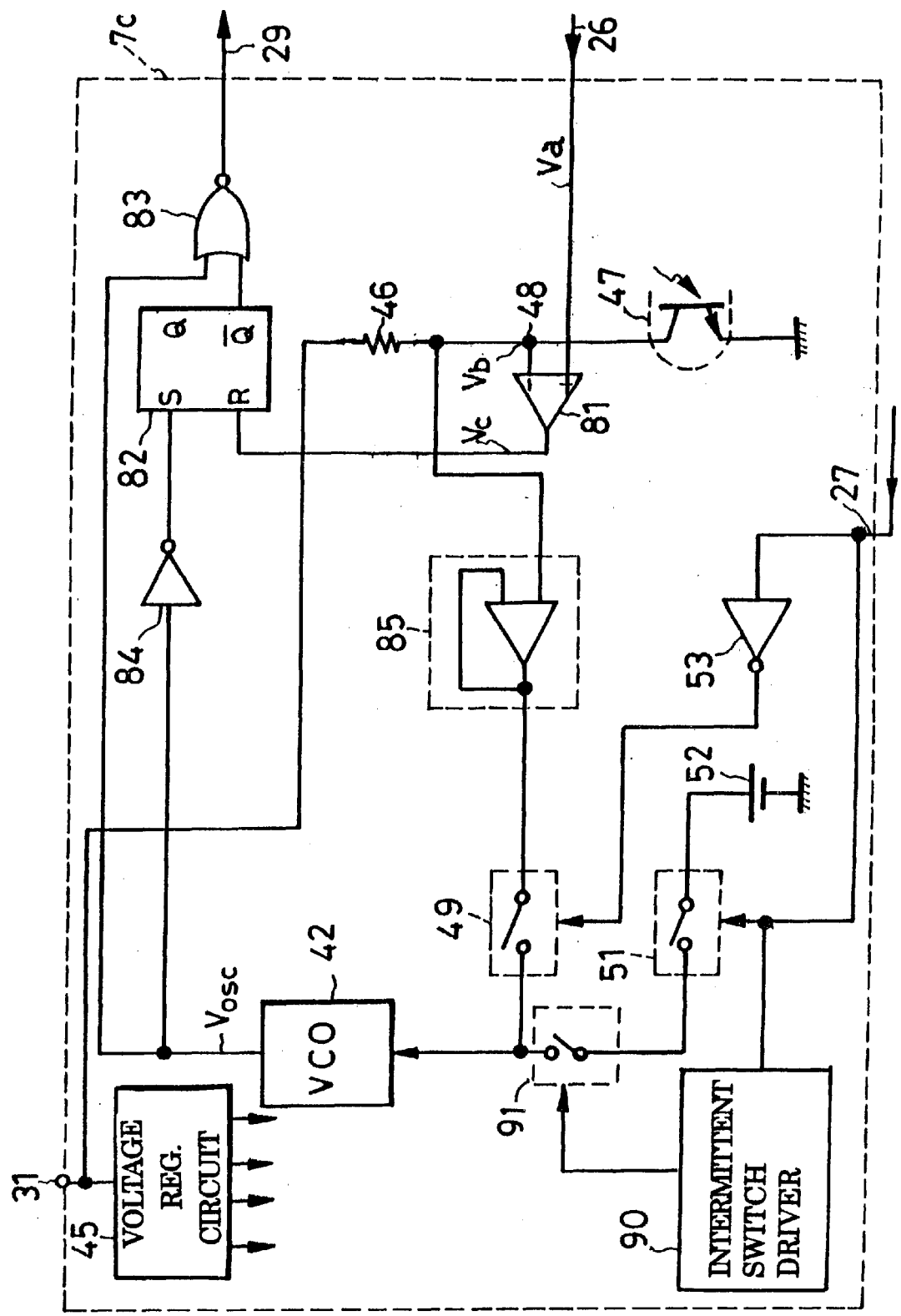
FIG. 14 is a schematic electrical diagram showing a modification of the switch control circuit of the FIG. 1 converter.

Embodiment of FIG. 14

FIG. 14 illustrates another modification 7c of the FIG. 12 switch control circuit 7b of the FIG. 11 converter. As will be noted from comparison of FIGS. 12 and 14, the modified switch control circuit 7c differs from the circuit 7b in having an intermittent switch driver circuit 90 and a third switch 91 in addition to all the circuit elements included in the FIG. 12 switch control circuit 7b. Connected between the load magnitude discriminator circuit 13, FIG. 11, and the third switch 91, the intermittent switch driver circuit 90 is itself similar to that shown at 80 in FIG. 9, putting out the pulses of FIG. 10(C) at constant intervals when the load magnitude discrimination signal on the line 27 indicates light loading, and hence closing the third switch intermittently.

The third switch 91 is connected between VCO 42 and second switch 51. Closed intermittently in light load mode, the third switch 91 causes the VCO 42 to be powered intermittently from the power supply 52. Thus the FIG. 14 switch control circuit 7c offers the same advantages as does its FIG. 9 counterpart 7a. The switch control circuit 7c lends itself to use in substitution for the switch control circuit 7 of the FIG. 6 converter.

Figure 15:
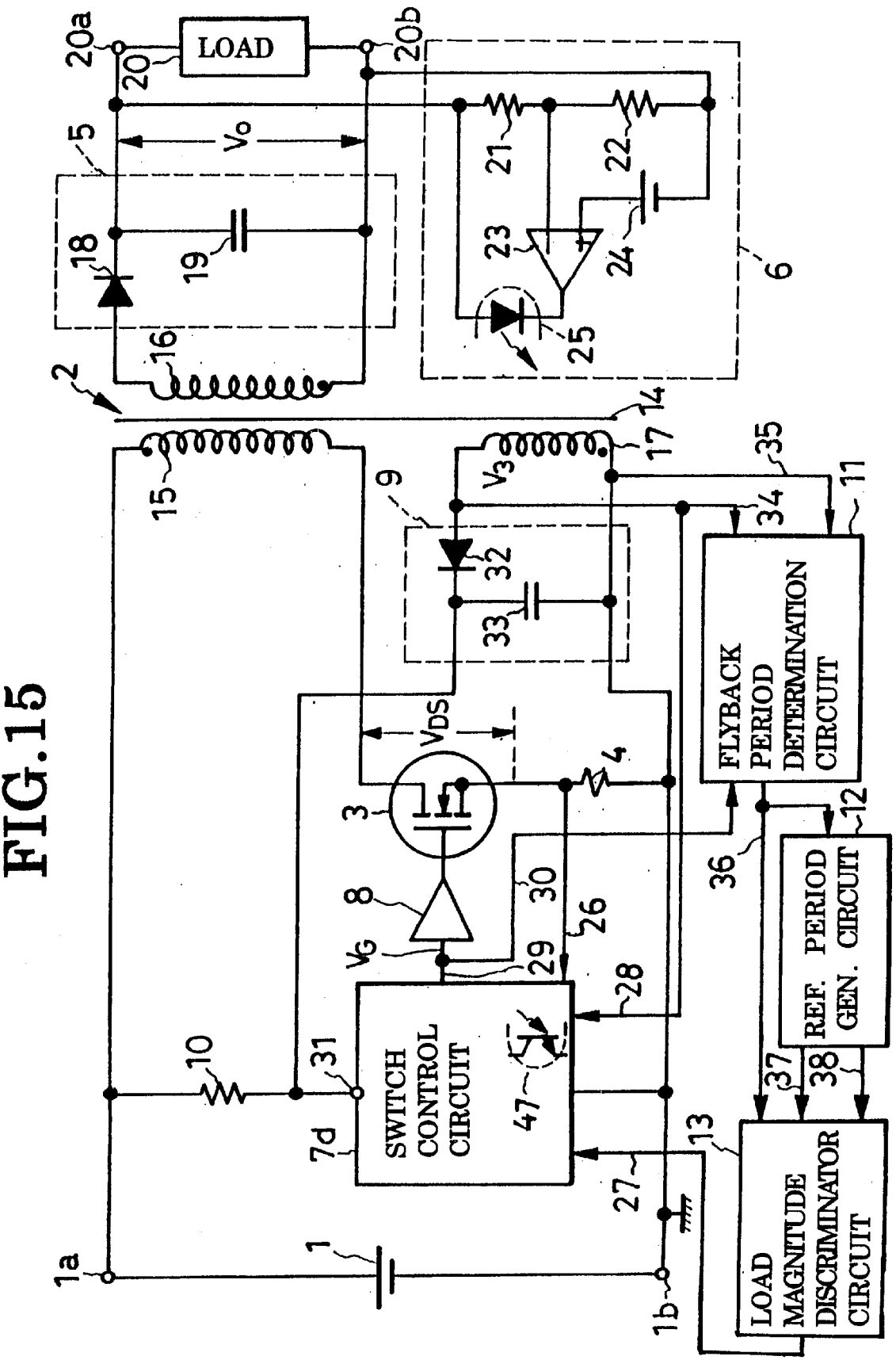
FIG. 15 is a diagram similar to FIG. 1 but showing a further preferred form of d.c.-to-d.c. converter according to the invention.
Figure 16:
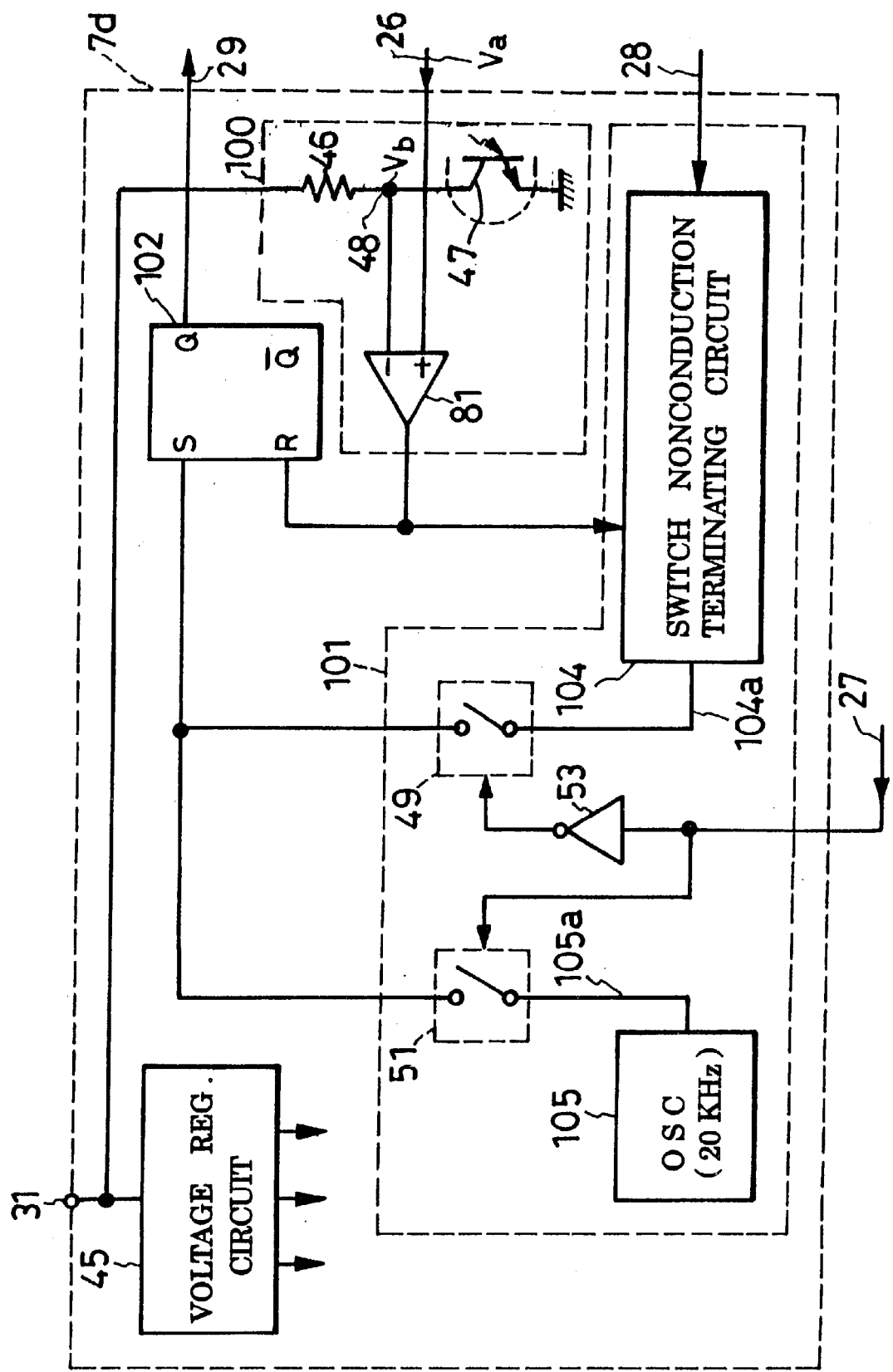
FIG. 16 is a schematic electrical diagram showing in more detail the switch control circuit of the FIG. 15 converter.
Figure 17:
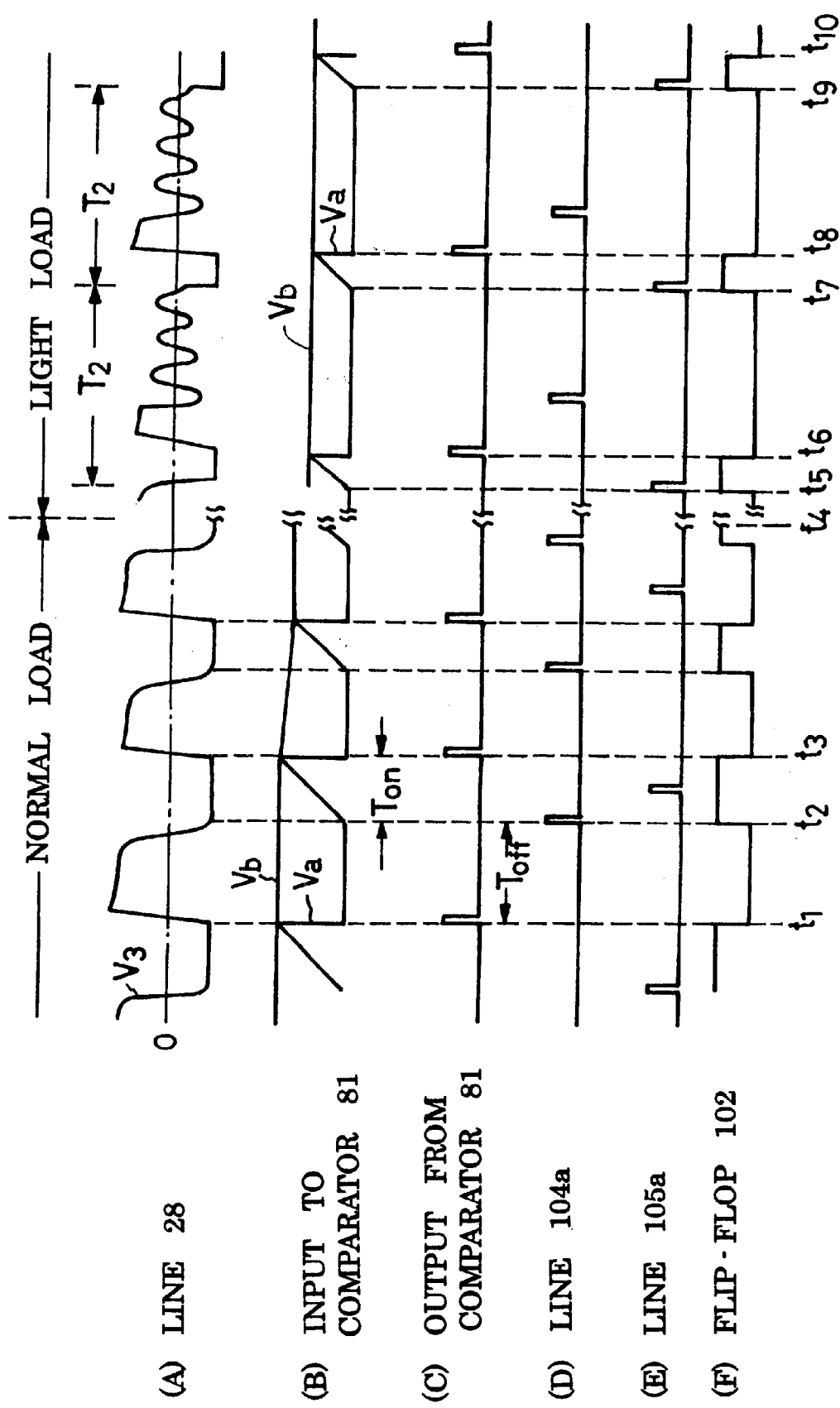
FIG. 17, consisting of (A) through (F), is a waveform diagram showing, in proper time relationship to one another, the waveforms appearing in various parts of the FIG. 16 switch control circuit.

Embodiment of FIGS. 15–17

The d.c.-to-d.c. converter of FIG. 15 incorporates a further modified switch control circuit 7d, shown in detail in FIG. 16, and is akin to that of FIG. 11 in other respects. The switch control circuit 7d relies on the flyback voltage developing across the transformer tertiary 17 for determination of the ending moments of the switch nonconducting periods during operation in normal load mode, so that the transformer tertiary is shown connected to the switch control circuit 7d by way of the line 28 in FIG. 15.

With reference to FIG. 16 the modified switch control circuit 7d comprises a switch conduction terminating circuit 100, a switch nonconduction terminating circuit 101, and an RS flip-flop 102, in addition to the voltage regulator circuit 45 as in the FIGS. 2 and 12 switch control circuits 7 and 7b. The switch conduction terminating circuit 100 is similar in construction to its counterpart of the FIG. 12 switch control circuit 7b, comprising the resistor 46, phototransistor 47, and comparator 81. Comparing the switch current signal $V_a$ on the line 26 and the voltage feedback signal $V_b$ from the junction 48, as at (B) in FIG. 17, the comparator 81 puts out a pulse, at (C) in FIG. 17, each time the switch current signal $V_a$ rises to the level of the voltage feedback signal $V_b$. The comparator 81 is connected to the reset input R of the flip-flop 102, so that this flip-flop is reset by each pulse from the comparator, as at (F) in FIG. 17.

The switch nonconduction terminating circuit 101 comprises a circuit 104 for termination of switch nonconducting periods in normal load mode, an oscillator 105 for termination of switch nonconducting periods in light load mode, two mode select switches 49 and 51, and a NOT circuit 53. The normal load mode switch nonconduction terminating circuit 101 has an input connected to the transformer tertiary 17, FIG. 15, by way of the line 28 for detection of the voltage across the same, and another input connected to the comparator 81. In response to each output pulse of the comparator 81, the circuit 101 ascertains the moment the voltage $V_3$ across the transformer tertiary 17 first drops to a minimum after the appearance of each FIG. 17(C) comparator output pulse. The resulting output pulses on the line 104a of the circuit 104 are indicated at (D) in FIG. 17. The transformer tertiary voltage $V_3$ minimizes when the voltage $V_{DS}$ across the switch minimizes after the duration of the flyback voltage.

The normal load mode switch nonconduction terminating circuit 104 has its output line 104a connected to the set input S of the flip-flop 102 via the first mode select switch 49. This switch 49 as aforesaid is under the control of the load magnitude discrimination signal on the line 27 via the NOT circuit 53. The flip-flop 102 is therefore set by each FIG. 17(D) output pulse of the circuit 104, as at $t_2$. Having its Q output connected directly to the switch 3 via the driver circuit 8, the flip-flop 102 provides the switching pulses $V_G$ for on-off control of the switch 3. The operation of this converter in normal load mode is similar to that of the known ringing choke comparator, with both conducting periods $T_{on}$ and nonconducting periods $T_{off}$ of the switch 3 changing with power consumption by the load 20.

For termination of the nonconducting periods of the switch 3 in light load mode, on the other hand, the oscillator 105 puts out pulses on its output line 105a, as at (E) in FIG. 17, with a repetition frequency of, typically, 20 kHz, which is less than the minimum switching frequency of the switch 3 in normal load mode. The oscillator output line 105a is connected via the second mode select switch 51 to the set input S of the flip-flop 102. This second mode select switch 51 is closed in light load mode, as after $t_4$ in FIG. 17, so that the flip-flop 102 will be set as at $t_5, t_7$ and $t_9$ by the FIG. 17(E) output pulses of the oscillator 105 and reset at $t_6$, $t_8$ and $t_{10}$ by the FIG. 17(C) output pulses of the comparator 81.

The provision of the dedicated oscillator 105 for termination of the nonconducting periods of the switch 3 is not an absolute necessity; instead, an oscillator included in the normal load mode switch nonconduction terminating circuit 104 may be utilized for obtaining the FIG. 17(E) pulses. In short the switch nonconduction terminating circuit 101 can be of any design as long as it can provide a first series of pulses for terminating the conducting periods of the switch 3 being driven in normal load mode as in the ringing choke converter, and a second series of pulses for terminating the conducting periods of the switch being driven in light load mode at a lower switching frequency than in normal load mode.

The FIG. 15 converter discriminates between normal and light load modes just like the FIG. 1 converter, so that it gains the same advantages therewith. Switching loss is further reduced in this embodiment, moreover, because the switch is turned on when the voltage across the same is practically zero. When the voltage across the switch becomes zero is not detected in light load mode in this particular embodiment of the invention. It is, of course, modifiable to turn on the switch at no voltage. It is also possible to use this switch control circuit 7d in place of its FIG. 6 counterpart 7.

Figure 18:
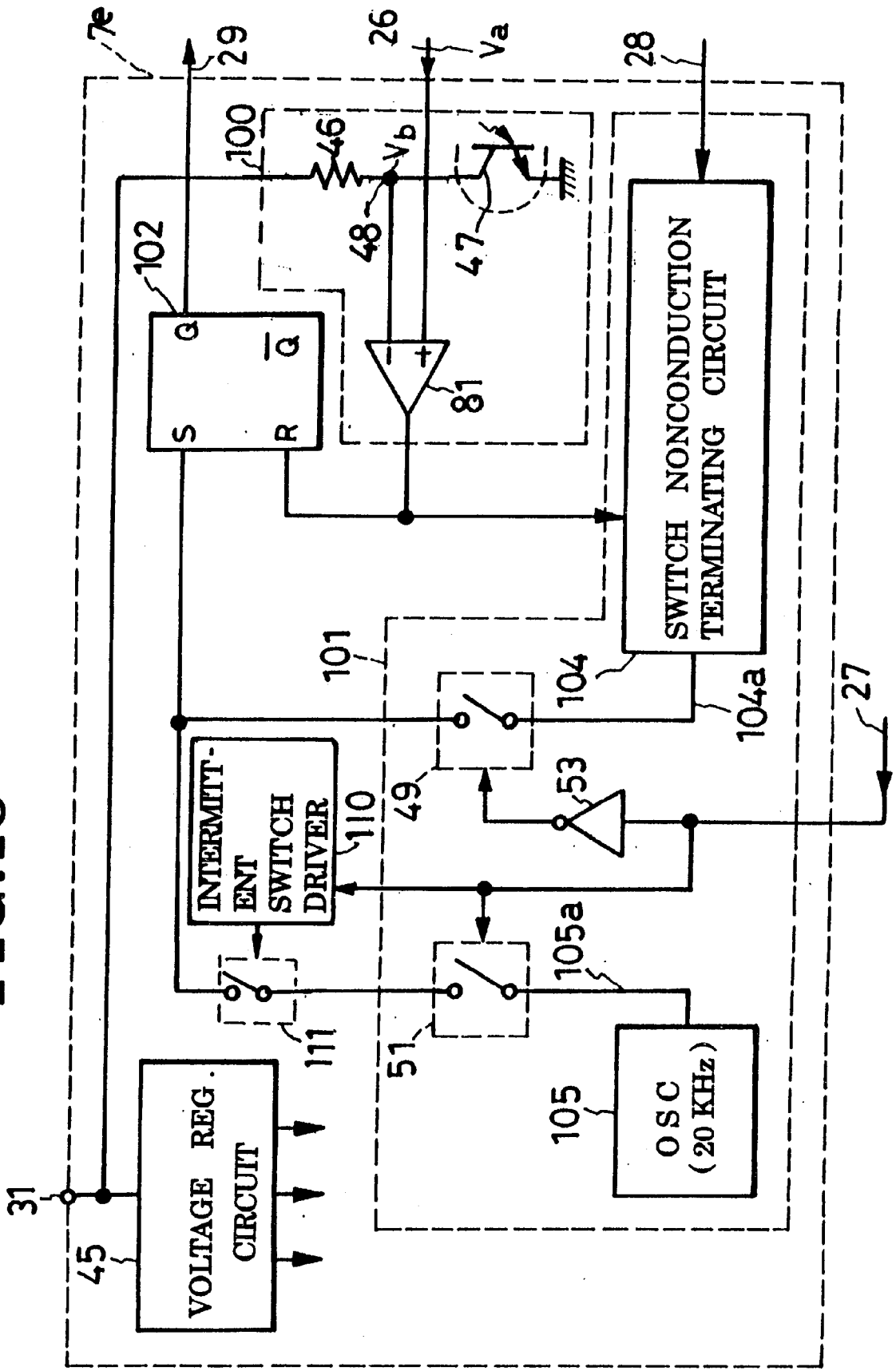
FIG. 18 is a schematic electrical diagram of another modification of the switch control circuit of the FIG. 1 converter.

Embodiment of FIG. 18

In FIG. 18 is shown a still further modified switch control circuit 7e, suitable for use in the FIG. 15 converter in substitution for the FIG. 16 switch control circuit 7d. The switch control circuit 7e differs from its FIG. 16 counterpart 7d in having an intermittent switch driver circuit 110 and a switch 111 in addition to all the other parts and components existing in the latter. The switch 111 is connected between the switch 51 and the set input S of the RS flip-flop 102, and the intermittent switch driver circuit 110 between the output line 27 of the load magnitude discriminator circuit 13, FIG. 15, and the control input of the switch 111.

Like its FIG. 14 counterpart 90, the intermittent switch driver circuit 110 causes the switch 3 to be driven on and off at regular intervals in light load mode in response to the load magnitude discrimination signal fed over the line 27. The mean number of switchings per unit length of time is thus reduced in light load mode. This switch control circuit 7e could be used in the FIG. 6 converter in place of its switch control circuit 7.

Figure 19:
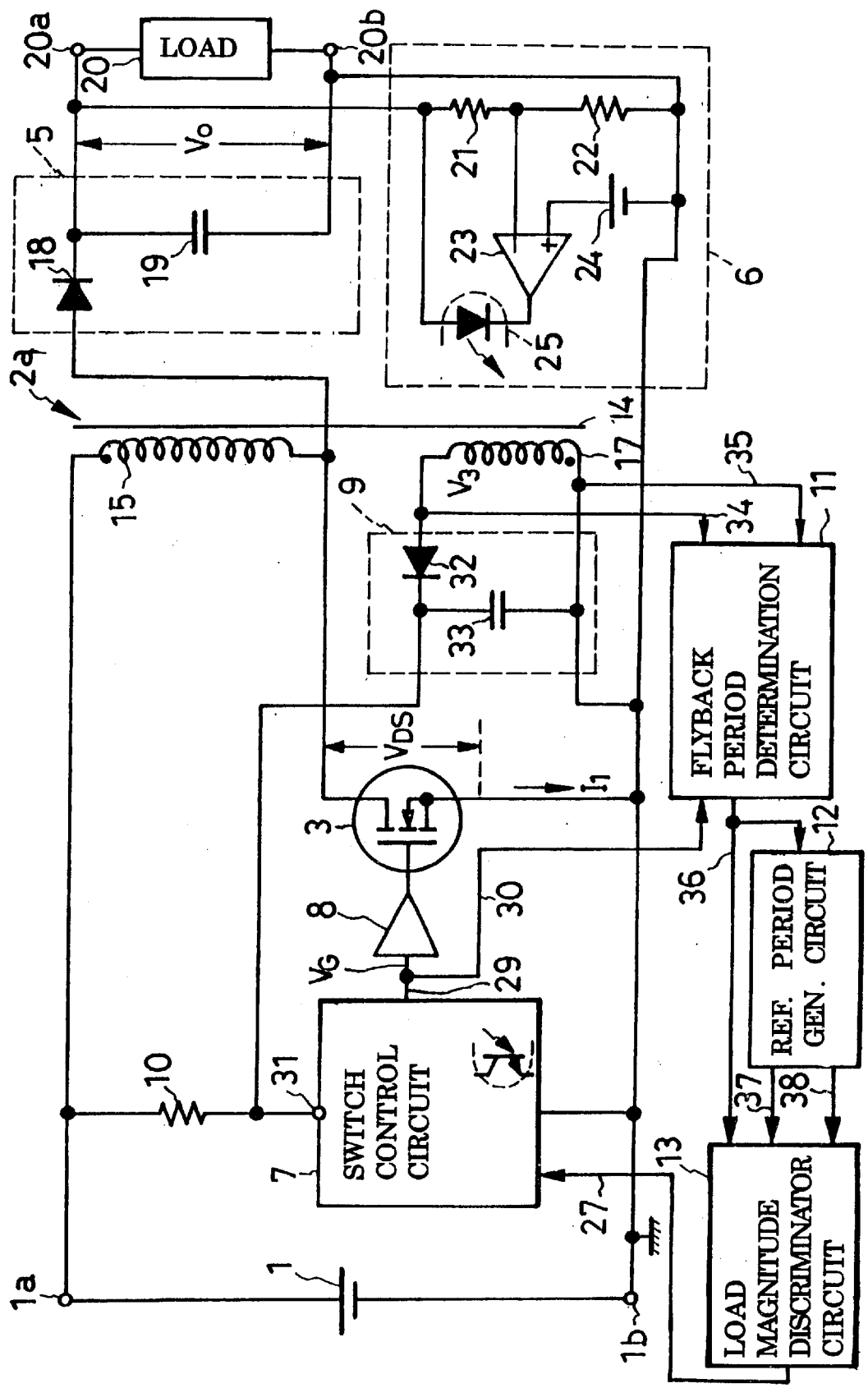
FIG. 19 is a diagram similar to FIG. 1 but showing a still further preferred form of d.c.-to-d.c. converter according to the invention.

Embodiment of FIG. 19

The final embodiment of the invention differs from that of FIG. 1 in having a reactor or inductor 2a in place of the transformer 2, and having the rectifying and smoothing circuit 5 connected in parallel with the switch 3. The reactor 2a has the windings 15 and 17 but no equivalent to the secondary transformer 16 of the FIG. 1 transformer 2. The other details of construction are as previously set forth with reference to FIGS. 1–3.

In operation the rectifying diode 18 of the rectifying and smoothing circuit 5 will be reverse-biased during the conducting periods of the switch 3, thereby causing energy to be stored on the reactor 2a. Forward-biased during the nonconducting periods of the switch 3, on the other hand, the rectifying diode 18 will cause the reactor to release the energy. The capacitor 19 will then be charged by the resultant of the voltage across the power supply 1 and that across the reactor winding 15. In short this converter will function as step-up switching regulator. This type of reactor could be used in all the other embodiments of the invention disclosed herein.

Possible Modifications

Notwithstanding the foregoing detailed disclosure, it is not desired that the present invention be limited by the exact showing of the drawings or the description thereof. The following, then, is a brief list of possible modifications, alterations and adaptations of the illustrated embodiments which are all believed to fall within the scope of the invention:

1. The invention could be embodied in a forward d.c.-to-d.c. converter in which the transformer secondary 16 is polarized to cause conduction through the diode 18 of the rectifying and smoothing circuit 5 during the conducting periods of the switch 3.

2. The output voltage $V_o$ could be detected not from the rectifying and smoothing circuit 5 but from, for instance, the rectifying and smoothing circuit 9 connected to the transformer tertiary 17, the output voltage of the latter circuit 9 being indicative of the converter output voltage.

3. The switch 3 could take the form of semiconductor switching devices other than the FET, an example being an insulated-gate bipolar transistor.

4. The output voltage detector circuit 6 could be electrically connected to the switch control circuit 7, instead of optically as in all the embodiments disclosed.

5. The known resonance circuit could be added for reduction of switching loss.

6. The switch current could be magnetoelectrically, as by means of a Hall-effect device.

7. The conducting periods of the switch 3 could be detected from the output from the switch drive circuit 8 or from the voltage $V_3$ across the transformer tertiary 17.

8. The signal indicative of the second reference period $T_B$ could be obtained not from the devoted circuit 71 but by a circuit in which the second reference period is formed by adding a prescribed length of time to the first reference period $T_A$.

What is claimed is:

1. A d.c.-to-d.c. converter to be connected between a d.c. power supply and a load to be powered, comprising:
   (a) a pair of input terminals to be connected to a d.c. power supply for inputting a unidirectional voltage;
   (b) a switch connected between the pair of input terminals in order to be repeatedly turned on and off by a series of switching pulses ($V_G$) for switching the d.c. power supply;
   (c) inductance means connected in series with the switch;
   (d) a rectifying and smoothing circuit connected to the inductance means for providing an output voltage ($V_o$) to be applied to the load;
   (e) an output voltage detector circuit for detecting the output voltage ($V_o$) of the converter;
   (f) a switch control circuit connected between the output voltage detector circuit and the switch for delivering to the latter the series of switching pulses ($V_G$) which are modulated according to the converter output voltage ($V_o$) in order to keep the converter output voltage constant;
   (g) a flyback period determination circuit for providing a flyback period signal ($V_f$) indicative of a flyback period ($T_f$) during which a flyback voltage exists across the inductance means after the switch has been turned off each time;
   (h) a reference period generator circuit for providing at least one reference period of time ($T_A$, $T_B$); and
   (i) a load magnitude discriminator circuit having inputs connected to the flyback period determination circuit and to the reference period generator circuit in order to provide a load magnitude discrimination signal indicative of whether the converter is under normal or light load by comparing the flyback period ($T_f$) and the reference period ($T_A$, $T_B$), the load magnitude discrimination signal being delivered to the switch control circuit for causing the same to make on-off control of the switch in either of two different prescribed modes depending upon whether the converter is under normal or light load.

2. The d.c.-to-d.c. converter of claim 1 wherein the reference period generator circuit comprises:

19

(a) a first reference period generator for providing a signal indicative of a first reference period of time ($T_A$) following the beginning of each flyback period ($T_f$); and (b) a second reference period generator for providing a signal indicative of a second reference period of time ($T_B$) following the beginning of each flyback period ($T_f$), the second reference period being longer than the first reference period.

3. The d.c.-to-d.c. converter of claim 2 wherein the load magnitude discriminator circuit comprises:

(a) first circuit means for comparing each flyback period ($T_f$) with the first reference period ($T_A$);

(b) second circuit means for comparing each flyback period ($T_f$) with the second reference period ($T_B$); and (c) third circuit means connected between the first and second circuit means of the load magnitude discriminator circuit and the switch control circuit for supplying to the latter the load magnitude discrimination signal indicative of normal loading when each flyback period ($T_f$) is longer than the second reference period ($T_B$), and of light loading when each flyback period is not longer than the first reference period ($T_A$).

4. The d.c.-to-d.c. converter of claim 2 wherein the load magnitude discriminator circuit comprises:

(a) a first D flip-flop having a data input connected to the flyback period determination circuit for inputting the flyback period signal ($V_f$), and a clock input connected to the first reference period generator in order to be clocked at the end of the first reference period ($T_A$);

(b) a second D flip-flop having a data input connected to the flyback period determination circuit for inputting the flyback period signal ($V_f$), and a clock input connected to the second reference period generator in order to be clocked at the end of the second reference period ($T_B$); and (c) an RS flip-flop having a set input connected to the first D flip-flop in order to be thereby triggered when the first D flip-flop is reset, a reset input connected to the second D flip-flop in order to be thereby triggered when the second D flip-flop is set, and an output for providing the load magnitude discrimination signal which indicates normal loading when the RS flip-flop is set, and light loading when the RS flip-flop is reset.

5. The d.c.-to-d.c. converter of claim 1 wherein the switch control circuit comprises:

(a) first circuit means for making on-off control of the switch at a first repetition frequency when the load magnitude discrimination signal from the load magnitude discriminator circuit indicates normal loading; and (b) second circuit means for making on-off control of the switch at a second repetition frequency, which is less than the first repetition frequency, when the load magnitude discrimination signal indicates light loading.

6. The d.c.-to-d.c. converter of claim 1 wherein the switch control circuit comprises:

(a) first circuit means for making on-off control of the switch at a repetition frequency that is in inverse proportion to the load magnitude when the load magnitude discrimination signal from the load magnitude discriminator circuit indicates normal loading; and (c) second circuit means for making on-off control of the switch at a fixed repetition frequency, which is less than a minimum of the repetition frequencies during normal loading, when the load magnitude discrimination signal indicates light loading.

20

7. The d.c.-to-d.c. converter of claim 1 wherein the switch control circuit comprises:

(a) first circuit means for making on-off control of the switch at a prescribed repetition frequency when the load magnitude discrimination signal from the load magnitude discriminator circuit indicates normal loading; and (b) second circuit means for making on-off control of the switch at intervals at the prescribed repetition frequency when the load magnitude discrimination signal indicates light loading.

8. The d.c.-to-d.c. converter of claim 1 wherein the switch control circuit comprises:

(a) first circuit means for making on-off control of the switch at a repetition frequency that is in inverse proportion to the load magnitude when the load magnitude discrimination signal from the load magnitude discriminator circuit indicates normal loading; and (b) second circuit means for making on-off control of the switch at intervals, and at a repetition frequency less than a minimum of the repetition frequencies during normal loading, when the load magnitude discrimination signal indicates light loading.

9. A d.c.-to-d.c. converter to be connected between a d.c. power supply and a load to be powered, comprising:

(a) a pair of input terminals to be connected to a d.c. power supply for inputting a unidirectional voltage;

(b) a switch connected between the pair of input terminals in order to be repeatedly turned on and off by a series of switching pulses of ($V_G$) for switching the d.c. power supply;

(c) inductance means connected in series with the switch;

(d) a rectifying and smoothing circuit connected to the inductance means for providing an output voltage ($V_o$) to be applied to the load;

(e) an output voltage detector circuit for detecting the output voltage ($V_o$) of the converter;

(f) a switch control circuit connected between the output voltage detector circuit and the switch for delivering to the latter the series of switching pulses ($V_G$) which are modulated according to the converter output voltage ($V_o$) in order to keep the converter output voltage constant;

(g) means for ascertaining the conducting periods ($T_{on}$) of the switch;

(h) a reference period generator circuit for providing at least one reference period of time ($T_A$, $T_B$); and (i) a load magnitude discriminator circuit having inputs connected to the ascertaining means and to the reference period generator circuit in order to provide a load magnitude discrimination signal indicative of whether the converter is under normal or light load by comparing the conducting periods ($T_{on}$) of the switch and the reference period ($T_A$, $T_B$), the load magnitude discrimination signal being delivered to the switch control circuit for causing the same to make on-off control of the switch in either of two different prescribed modes depending upon whether the converter is under normal or light load.

10. The d.c.-to-d.c. converter of claim 9 wherein the reference period generator circuit comprises:

(a) a first reference period generator for providing a signal indicative of a first reference period of time ($T_A$) following the beginning of each conducting period ($T_{on}$) of the switch; and (b) a second reference period generator for providing a signal indicative of a second reference period of time ($T_B$) following the beginning of each conducting period ($T_{on}$) of the switch, the second reference period being longer than the first reference period.

11. The d.c.-to-d.c. converter of claim 10 wherein the load magnitude discriminator circuit comprises:

(a) first circuit means for comparing each conducting period ($T_{on}$) of the switch with the first reference period ($T_A$);

(b) second circuit means for comparing each conducting period ($T_{on}$) of the switch with the second reference period ($T_B$); and (c) third circuit means connected between the first and second circuit means of the load magnitude discriminator circuit and the switch control circuit for supplying to the latter the load magnitude discrimination signal indicative of normal loading when each switch conducting period ($T_{on}$) is longer than the second reference period ($T_B$), and of light loading when each switch conducting period is not longer than the first reference period ($T_A$).

12. The d.c.-to-d.c. converter of claim 10 wherein the load magnitude discriminator circuit comprises:

(a) a first D flip-flop having a data input connected to the ascertaining means for inputting the switching pulses ($V_G$), and a clock input connected to the first reference period generator in order to be clocked at the end of the first reference period ($T_A$);

(b) a second D flip-flop having a data input connected to the ascertaining means for inputting the switching pulses ($V_G$), and a clock input connected to the second reference period generator in order to be clocked at the end of the second reference period ($T_B$); and (c) an RS flip-flop having a set input connected to the first D flip-flop in order to be thereby triggered when the first D flip-flop is reset, a reset input connected to the second D flip-flop in order to be thereby triggered when the second D flip-flop is set, and an output for providing the load magnitude discrimination signal which indicates normal loading when the RS flip-flop is set, and light loading when the RS flip-flop is reset.

13. The d.c.-to-d.c. converter of claim 9 wherein the switch control circuit comprises:

(a) first circuit means for making on-off control of the switch at a first repetition frequency when the load magnitude discrimination signal from the load magnitude discriminator circuit indicates normal loading; and (b) second circuit means for making on-off control of the switch at a second repetition frequency, which is less than the first repetition frequency, when the load magnitude discrimination signal indicates light loading.

14. The d.c.-to-d.c. converter of claim 10 wherein the switch control circuit comprises:

(a) first circuit means for making on-off control of the switch at a repetition frequency that is in inverse proportion to the load magnitude when the load magnitude discrimination signal from the load magnitude discriminator circuit indicates normal loading; and (b) second circuit means for making on-off control of the switch at a fixed repetition frequency, which is less than a minimum of the repetition frequencies during normal loading, when the load magnitude discrimination signal indicates light loading.

15. The d.c.-to-d.c. converter of claim 10 wherein the switch control circuit comprises:

(a) first circuit means for making on-off control of the switch at a prescribed repetition frequency when the load magnitude discrimination signal from the load magnitude discriminator circuit indicates normal loading; and (b) second circuit means for making on-off control of the switch at intervals at the prescribed repetition frequency when the load magnitude discrimination signal indicates light loading.

16. The d.c.-to-d.c. converter of claim 10 wherein the switch control circuit comprises:

(a) first circuit means for making on-off control of the switch at a repetition frequency that is in inverse proportion to the load magnitude when the load magnitude discrimination signal from the load magnitude discriminator circuit indicates normal loading; and (b) second circuit means for making on-off control of the switch at intervals, and at a repetition frequency less than a minimum of the repetition frequencies during normal loading, when the load magnitude discrimination signal indicates light loading.

* * * * *

UNITED STATES PATENT AND TRADEMARK OFFICE
CERTIFICATE OF CORRECTION

PATENT NO.   : 6,515,876 B2
DATED        : February 4, 2003
INVENTOR(S)  : Kengo Koike and Kei Okada It is certified that error appears in the above-identified patent and that said Letters Patent is hereby corrected as shown below:

Column 1,
Line 46, delete "unnecessary" and insert -- unnecessarily -- therefor;

Column 6,
Line 10, delete "II" and insert -- 11 -- therefor;
Line 16, delete the second occurrence of "37" and insert -- 38 -- therefor;

Column 8,
Line 16, delete "results" and insert -- result -- therefor;
Line 34, insert -- it -- before "is".

Signed and Sealed this

Thirtieth Day of December, 2003

JAMES E. ROGAN
*Director of the United States Patent and Trademark Office*